US007357907B2

(12) United States Patent
Resasco et al.

(10) Patent No.: US 7,357,907 B2
(45) Date of Patent: *Apr. 15, 2008

(54) METHOD FOR PRODUCING SINGLE WALLED CARBON NANOTUBES

(75) Inventors: Daniel E. Resasco, Norman, OK (US); Walter E. Alvarez, Norman, OK (US); Jose E. Herrera, Norman, OK (US); Leandro Balzano, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 660 days.

This patent is subject to a terminal disclaimer.

(21) Appl. No.: 10/689,258

(22) Filed: Oct. 20, 2003

(65) Prior Publication Data
US 2004/0197260 A1 Oct. 7, 2004

Related U.S. Application Data

(62) Division of application No. 10/118,834, filed on Apr. 8, 2002, now abandoned.

(60) Provisional application No. 60/307,208, filed on Jul. 23, 2001.

(51) Int. Cl.
*D01F 9/12* (2006.01)
(52) U.S. Cl. .................................. 423/447.3; 977/843
(58) Field of Classification Search ............ 423/447.2, 423/447.3; 977/843
See application file for complete search history.

(56) References Cited

U.S. PATENT DOCUMENTS

| 3,746,657 | A | 7/1973 | Miller et al. ............... 252/437 |
| 4,456,694 | A | 6/1984 | Blaskie et al. .............. 502/74 |
| 4,574,120 | A | 3/1986 | Thompson ................. 502/220 |
| 4,663,230 | A | 5/1987 | Tennent ..................... 428/367 |
| 5,165,909 | A | 11/1992 | Tennent et al. ............. 423/447 |
| 5,227,038 | A | 7/1993 | Smalley et al. ............. 204/173 |
| 5,300,203 | A | 4/1994 | Smalley ..................... 204/157 |
| 5,405,996 | A | 4/1995 | Suzuki et al. ............... 562/548 |
| 5,424,054 | A | 6/1995 | Bethune |
| 5,456,897 | A | 10/1995 | Moy et al. |
| 5,482,601 | A | 1/1996 | Ohshima et al. ............ 204/173 |
| 5,500,200 | A | 3/1996 | Mandeville et al. |
| 5,543,378 | A | 8/1996 | Wang ......................... 502/174 |
| 5,556,517 | A | 9/1996 | Smalley ..................... 204/157 |
| 5,560,898 | A | 10/1996 | Uchida et al. .............. 423/461 |
| 5,578,543 | A | 11/1996 | Tennent et al. ............. 502/180 |
| 5,587,141 | A | 12/1996 | Ohshima et al. ............ 423/461 |
| 5,591,312 | A | 1/1997 | Smalley ..................... 204/157 |
| 5,603,907 | A | 2/1997 | Grochowski ............... 423/210 |
| 5,641,466 | A | 6/1997 | Ebbesen et al. ............ 423/447 |
| 5,648,056 | A | 7/1997 | Tanaka ....................... 423/445 |
| 5,695,734 | A | 12/1997 | Ikazaki et al. .............. 423/461 |
| 5,698,175 | A | 12/1997 | Hiura et al. ................ 423/447 |
| 5,707,916 | A | 1/1998 | Snyder et al. .............. 502/416 |
| 5,744,235 | A | 4/1998 | Creehan ..................... 428/364 |
| 5,747,161 | A | 5/1998 | Iijima |
| 5,753,088 | A | 5/1998 | Olk ............................ 204/173 |
| 5,773,834 | A | 6/1998 | Yamamoto et al. ......... 204/192 |
| 5,780,101 | A | 7/1998 | Nolan et al. ............... 427/216 |
| 5,814,290 | A | 9/1998 | Niu et al. ................... 423/344 |
| 5,877,110 | A | 3/1999 | Snyder et al. .............. 502/180 |
| 5,965,267 | A | 10/1999 | Nolan et al. ............... 428/408 |
| 5,985,232 | A | 11/1999 | Howard et al. ............. 423/447 |
| 5,997,832 | A | 12/1999 | Lieber et al. ............... 423/249 |
| 6,099,965 | A | 8/2000 | Tennent et al. |
| 6,221,330 | B1 | 4/2001 | Moy et al. |
| 6,312,303 | B1 | 11/2001 | Yaniv et al. |
| 6,333,016 | B1 | 12/2001 | Resasco et al. |
| 6,346,189 | B1 | 2/2002 | Dai et al. |
| 6,401,526 | B1 | 6/2002 | Dai et al. |
| 6,413,487 | B1 | 7/2002 | Resasco et al. |
| 6,426,134 | B1 | 7/2002 | Lavin et al. |
| 6,432,866 | B1 | 8/2002 | Tennent et al. |
| 6,479,939 | B1 | 11/2002 | Yaniv et al. |

(Continued)

FOREIGN PATENT DOCUMENTS

EP    0 945 402 A1    9/1999

(Continued)

OTHER PUBLICATIONS

Bahr et al., "Functionalization of Carbon Nanotubes by Electrochemical Reduction of Aryl Diazonium Salts: A Bucky Paper Electrode," *J. Am. Chem. Cos.* vol. 123 (2001) pp. 6536-6542.
Buffa et al., "Side-Wall Functionalization of Single-Walled Carbon Nanotubes with 4-Hydroxymethylaniline Followed by Polymerization of ϵ-Caprolactone," *Macromolecules*, vol. 38, No. 20 (2005) pp. 8258-8263.
Dyke et al., "Unbundled and Highly Functionalized Carbon Nanotubes from Aqueous Reactions," *NanoLetters*, vol. 3, No. 9 (2003) pp. 1215-1218.
Saito, et al, "Electronic structure of chiral graphene tubules," *Appl. Phys. Lett.* vol. 60, No. 18 (May 4, 1992) pp. 2204-2206.
Alvarez et al., "Synergism of Co and Mo in the atalytic production of single-wall carbon nanotubes by decomposition of CO", *Elsevier Science Ltd.*, Carbon 39 (2001), pp. 547-558.

(Continued)

*Primary Examiner*—Stuart Hendrickson
(74) *Attorney, Agent, or Firm*—Dunlap, Codding & Rogers, P.C.

(57) ABSTRACT

A catalyst composition and method of use of the catalyst composition for producing single-walled carbon nanotubes (SWNTs). The catalyst is cobalt (Co) and molybdenum (Mo) on a silica support. The Mo occurs primarily as dispersed Mo oxide clusters on the support while the Co is primarily in an octahedral configuration in a $CoMoO_4$-like phase disposed on the Mo oxide clusters. In the method, the catalyst is used and the process conditions manipulated in such a manner as to enable the diameters of the SWNTs to be substantially controlled.

24 Claims, 24 Drawing Sheets

U.S. PATENT DOCUMENTS

| | | | |
|---|---|---|---|
| 6,573,643 | B1 | 6/2003 | Kumar et al. |
| 6,580,225 | B2 | 6/2003 | Yaniv et al. |
| 6,596,187 | B2 | 7/2003 | Coll et al. |
| 6,599,961 | B1 | 7/2003 | Pienkowski et al. |
| 6,656,339 | B2 | 12/2003 | Talin et al. |
| 6,664,722 | B1 | 12/2003 | Yaniv et al. |
| 6,683,783 | B1 | 1/2004 | Smalley et al. |
| 6,692,717 | B1 | 2/2004 | Smalley et al. |
| 6,699,457 | B2 | 3/2004 | Cortright et al. |
| 6,752,977 | B2 | 6/2004 | Smalley et al. |
| 6,756,025 | B2 | 6/2004 | Colbert et al. |
| 6,761,870 | B1 | 7/2004 | Smalley et al. |
| 6,936,233 | B2 | 8/2005 | Smalley et al. |
| 6,939,525 | B2 | 9/2005 | Colbert et al. |
| 7,094,386 | B2 * | 8/2006 | Resasco et al. .......... 423/447.3 |
| 2001/0031900 | A1 | 10/2001 | Margrave et al. |
| 2002/0084410 | A1 | 7/2002 | Colbert et al. |
| 2002/0094311 | A1 | 7/2002 | Smalley et al. |
| 2002/0096634 | A1 | 7/2002 | Colbert et al. |
| 2002/0127169 | A1 | 9/2002 | Smalley et al. |
| 2002/0127171 | A1 | 9/2002 | Smalley et al. |
| 2002/0159944 | A1 | 10/2002 | Smalley et al. |
| 2002/0165091 | A1 | 11/2002 | Resasco et al. |
| 2003/0077515 | A1 | 4/2003 | Chen et al. |
| 2003/0089893 | A1 | 5/2003 | Niu et al. |
| 2003/0147802 | A1 | 8/2003 | Smalley et al. |
| 2003/0175200 | A1 | 9/2003 | Smalley et al. |
| 2003/0180526 | A1 | 9/2003 | Winey et al. |
| 2004/0009346 | A1 | 1/2004 | Jang et al. |
| 2004/0028859 | A1 | 2/2004 | LeGrande et al. |

FOREIGN PATENT DOCUMENTS

| | | |
|---|---|---|
| EP | 01 93 9821 | 6/2004 |
| JP | 406122489 | 5/1994 |
| JP | 06/228824 | 8/1994 |
| JP | 11/139815 | 5/1999 |
| WO | WO 97/09272 | 3/1997 |
| WO | WO 98/39250 | 9/1998 |
| WO | WO 98/42620 | 10/1998 |
| WO | WO 00/17102 | 3/2000 |
| WO | WO 00/26138 | 5/2000 |
| WO | PCT/US00/15362 | 6/2000 |
| WO | WO 00/73205 | 12/2000 |
| WO | WO 02/060813 A2 | 8/2002 |
| WO | WO 03/048038 | 6/2003 |
| WO | PCT/US02/23155 | 7/2003 |
| WO | WO 2004/001107 | 12/2003 |
| WO | PCT/US03/19664 | 3/2004 |
| WO | PCT/US2004/012986 | 5/2005 |

OTHER PUBLICATIONS

Bandow et al., "Effect of the Growth Temperature on the Diameter Distribution and Chirality of Single-Wall Carbon Nanotubes", *The American Physical Society*, Physical Review Letters, vol. 80, No. 17, (1998), pp. 3779-3782.
Bethune et al., "Cobalt-Catalysed Growth of Carbon Nanotubes with Single-Atomic-Layer Walls," *Nature*, 363:605-607, Jun. 1993.
V. Brotons et al., "Catalytic influence of bimetallic phases for the synthesis of single-walled carbon nanotubes", Journal of Molecular Catalysis, A: Chemical 116 (1997) 397-403.
Cassell et al., "Large Scale CVD Synthesis of Single-Walled Carbon Nanotubes", American Chemical Society, pp. 6483-6492, 1999.
Chaturvedi et al., "Properties of pure and sulfided NiMo04 and CoMo04 catalysts: TPR, XANES and time-resolved XRD studies", Database Accession No. EIX99044490981 XP002246342, Proceedings of the 1997 Mrs Fall Symposium, Boston, MA, USA, Dec. 2-4, 1997; Mater Res Soc Symp Proc, Materials Research Society Symposium-Proceedings, Recent Advances in Catalytic Materials, 1998, Mrs. Warrendale, PA, USA.
Che et al., "Chemical Vapor Deposition Based Synthesis of Carbon Nanotubes and Nanofibers Using a Template Method", Chemical Mater. 1998, 10, pp. 260-267.
Chen et al., "Growth of carbon nanotubes by catalytic decomposition of CH4 or CO on a Ni-MgO catalyst", CARBON vol. 35, No. 10-11, pp. 1495-1501, 1997.
Cheng et al.; "Bulk Morphology and Diameter Distribution of Single-Walled Carbon Nanotubes Synthesized by Catalytic Decomposition of Hydrocarbons," Chemical Physics Letters, 289:602-610, 1998.
Cheng et al.; "Large-Scale and Low-Cost Synthesis of Single-Walled Carbon Nanotubes by the Catalytic Pyrolysis of Hydrocarbons," Applied Physics Letters, 72(25):3282-3284, Jun. 25, 1998.
Dai et al.; "Single-Wall Nanotubes Produced By Metal-Catalyzed Disproportionation of Carbon Monoxide," Chemical Physics Letters, 260:471-475, 1996.
Database, Accession No. 1999-366878, Cano, "Canno KK", XP-002149235, May 25, 1999.
De Boer et al., "The cobalt-molybdenum interaction in CoMo/SiO2 catalysts: A CO-oxidation study", Elsevier Science Ltd., Solid State Ionics 63-65 (1993), pp. 736-742.
Fonseca et al., "Synthesis of single-and multi-wall carbon nanotubes over supported catalysts", Applied Physics A, 67, pp. 11-22, 1998.
Govindaraj et al., "Carbon structures obtained by the disproportionation of carbon monoxide over nickel catalysts", Materials Research Bulletin, vol. 33, No. 4, pp. 663-667, 1998.
Hafner et al., "Catalytic growth of single-wall carbon nanotubes from metal particles", Chemical Physics Letters, 296, pp. 195-202, 1998.
Hernadi et al., "Catalytic synthesis of carbon nanotubes using zeolite support", Elsevier Science Inc. 1996.
Hyperion Catalysis International Website; http://www.fibrils.com/esd.htm ;"Unique Slough Resistant SR™ Series ESD Thermoplastic Product Line Offers Reduced Particle Contamination For Demanding Electronic Applications," and Hyperion Homepage http://www.fibrils.com, Nov. 19, 2001.
Iijima, Sumio; "Helical Microtubules of Graphitic Carbon," Nature, 354:56-58, Nov. 1991.
Iijima et al.; "Single-Shell Carbon Nanotubes of 1-nm Diameter", Nature 363:603-605, Jun. 1993.
Ivanov et al.; "The Study of Carbon Nanotubes Produced by Catalytic Method," Chemical Physics Lettersm 223:329-335, 1994.
Journet et al.; "Large-Scale Production of Single-Walled Carbon Nanotubes by the Electric-Arc Technique," Nature, 338:756-758, Aug. 1997.
B. Kitiyanan et al., "Controlled production of single-wall carbon nanotubes by catalytic decomposition of CO on bimetallic Co-Mo catlaysts", Chemical Physics Letters, 317 (2000), pp. 497-503, Feb. 4, 2000.
Krishnankutty et al.; "The Effect of Copper on the Structural Characteristics of Carbon Filaments Produced from Iron Catalyzed Decomposition of Ethylene," Catalysts Today, 37:295-307, 1997.
Li et al., "Large-Scale Synthesis of Aligned Carbon Nanotubes", SCIENCE, vol. 274, pp. 1701-1703, Dec. 6, 1996.
Rinzler et al.; "Large-Scale Purification of Single-Wall Carbon Nanotubes: Process, Product, and Characterization," Applied Physics A, 67:29-37, 1998.
Thess et al., Crystalline Ropes of Metallic Carbon Nanotubes, SCIENCE, vol. 273, pp. 483-487, Jul. 26, 1996.
I. Willems et al., "Control of the outer diameter of thin carbon nanotubes synthesized by catalytic decomposition of hydrocarbons", Chemical Physics Letters, 317 (2000) pp. 71-76.
Yokobson et al.; "Fullerene Nanotubes: $C_{1,000,000}$ and Beyond," *American Scientist*, 85:324-337, Jul.-Aug. 1997.
U.S. Appl. No. 60/101,093, filed Sep. 18, 1998, Smalley et al.
U.S. Appl. No. 60/106,917, filed Nov. 3, 1998, Smalley et al.
U.S. Appl. No. 60/114,588, filed Dec. 31, 1998, Smalley et al.
U.S. Appl. No. 60/117,287, filed Jan. 26, 1999, Smalley et al.
U.S. Appl. No. 60/161,728, filed Oct. 27, 1999, Smalley et al.
Anderson et al., "50 nm Polystyrene Particles via Miniemulsion Polymerization", Macromolecules, American Chemical Society, vol. 35, pp. 574-576, 2002.

Bandow et al., "Purification of Single-Wall Carbon Nanotubes by Microfiltration," *J.Phys.Chem.B*, vol. 101, (1997) pp. 8839-8842.

Bower et al., "Deformation of Carbon Nanotubes in Nanotube-Polymer Composites", Applied Physics Letters, vol. 74, No. 22, pp. 3317-3319, May 31, 1999.

Cadek et al., "Mechanical and Thermal Properties of CNT and CNF Reinforced Polymer Composites", Structural and Electronic Properties of Molecular Nanostructures, American Institute of Physics, pp. 562-565, 2002.

Chattopadhyay, et al., "A Route for Bulk Separation of Semiconducting from Metallic Single-Wall Carbon Nanotubes", Journal of American Chemical Society, vol. 125, No. 11, pp. 3370-3375, 2003.

Chen et al., "Bulk Separative Enrichment in Metallic or Semiconducting Single-Walled Carbon Nanotubes", Nano Letters, xxxx vol. 0, No. 0, page est: 4.9 A-E, vol. 3 No. 9 pp. 1245-1249, Sep. 2003.

Chen et al., "Dissolution of Full-Length Single-Walled Carbon Nanotubes", J. Phys. Chem. B, vol. 105, pp. 2525-2528, 2001.

Deng et al., "Hybrid Composite of Polyaniline Containing Carbon Nanotube", Chinese Chemical Letters, vol. 12, pp. 1037-1040, 2001.

Franco et al., "Electric and magnetic properties of polymer electrolyte/carbon black composites", Solid State Ionics 113-115, pp. 149-160, 1998.

Gaspar et al., "The influence of Cr precursors in the ethylene polymerization on $Cr/SiO_2$ catalysts", Applied Catalysis A: General, vol. 227, pp. 240-254, 2002.

Gong et al., "Surfactant-Assisted Processing of Carbon Nanotube/Polymer Composites", Chemical Material, vol. 12, pp. 1049-1052, 2000.

Hamon et al., "End-group and defect analysis of soluble single-walled carbon nanotubes", Chemical Physics Letters, vol. 347 pp. 8-12, 2001.

Hwang et al., "Carbon nanotube reinforced ceramics", Journal of Materials Chemistry, vol. 11, pp. 1722-1725, 2001.

Jin et al., "Alignment of Carbon nanotubes in a polymer matrix by mechanical stretching", Applied Physics Letters, vol. 73, No. 9, pp. 1197-1199, Aug. 31, 1998.

Landfester et al., "Miniemulsion polymerization", Jun. 4, 2003, http://www.mpikg-golm.mpg.de/kc/landfester/, 1-22.

Landfester, "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Patent Abstracts of Japan, vol. 1996, No. 12, Dec. 26, 1996, and JP 0 8 198611 A (NEC Corp), Aug. 6, 1996, Abstract.

Pompeo et al., "Water Solubilization of Single-Walled Carbon Nanotubes by Functionalization with Glucosamine", Nano Letters, American Chemical Society, vol. 2, No. 4, pp. 369-373, 2002.

Qian et al., "Load transfer and deformation mechanisms in carbon nanotube-polystyrene composites",Applied Physics Letters, American Institute of Physics, vol. 76, No. 20, pp. 2868-2870, May 15, 2000.

Razavi, "Metallocene catalysts technology and environment", Chemistry 3, pp. 615-625, 2000.

Sears et al., "Raman scattering from polymerizing styrene. I. Vibrational mode analysis$^a$)", J. Chem. Phys., vol. 75, No. 4, pp. 1589-1598, Aug. 15, 1981.

Shaffer et al., "Fabrication and Characterization of Carbon Nanotube/Poly (vinyl alcohol) Composites", Advanced Materials, vol. II, No. 11, pp. 937-941, 1999.

Tahji et al., "Purification Procedure for Single-Wall Nanotubes", J. Phys. Chem. B, vol. 101, pp. 1974-1978 (1997).

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Latexes Made by Miniemulsion Polymerization", Langmuir, American Chemical Society, vol. 17, pp. 5775-5780, 2001.

Zhao, et al., "Chromatographic Purification and Properties of Soluble Single-Walled Carbon Nanotubes", American Chemical Society, Pages Est: 4.1, pp. A-E, Feb. 22, 2001.

Zhu et al., "Direct Synthesis of Long Single-Walled Carbon Nanotube Strands", Science, vol. 296, pp. 884-886, May 13, 2002.

\* cited by examiner ional of U.S. Ser. No.

METHOD FOR PRODUCING SINGLE WALLED CARBON NANOTUBES

RELATED REFERENCES

The present application is a divisional of U.S. Ser. No. 10/118,834, filed Apr. 8, 2002 now abandoned, which claims the benefit of the filing date of U.S. Provisional Application 60/307,208 filed on Jul. 23, 2001, the specification and drawings of each of which are expressly incorporated by reference herein in their entirety.

BACKGROUND

Single-wall carbon nanotubes (SWNTs) exhibit exceptional chemical and physical properties that have opened a vast number of potential applications. Disproportionation of CO on several bimetallic catalysts resulting in a high selectivity towards the production of SWNTs at relatively low temperatures has been shown in WO 00/73205 A1 (corresponding to U.S. Ser. No. 09/389,553) and PCT/US01/17778 (corresponding to U.S. Ser. No. 09/587,257), each of which is hereby expressly incorporated herein in its entirety and each of which may contain subject matter related to the invention claimed herein. Among the various formulations investigated therein were catalysts comprising cobalt and molybdenum (Co and Mo) supported on silica and having low Co:Mo ratios.

The Co—Mo system is previously known in the field of catalysis due to its application in hydrotreating catalytic processes. In that system, however, silica generally is not the most suitable support, due to its weak interaction with the Co—Mo components. Most studies on the Co—Mo catalysts have focused on alumina-supported systems since alumina interacts with Co and Mo with the appropriate strength to generate the HDS active species. For that reason, alumina-supported Co—Mo catalysts are used in industrial practice in the form of sulfides. Although the structure of the sulfided Co—Mo catalysts is known almost at the atomic level, that of the non-sulfided oxidic precursor has received less attention. Using IR spectroscopy of adsorbed NO showed that the interaction between Mo and the alumina in the oxidic state was not greatly affected by the presence of Co. Further, in the oxidic state, a major portion of the Co apparently is inside the alumina lattice in a tetrahedral environment of oxygen ions and is not exposed to the gas phase. However, silica-supported Co—Mo displays a different behavior from that of the alumina-supported catalysts.

It would therefore be desirable to have a detailed picture of the structure of the Co—Mo catalyst so that the silica-supported Co—Mo catalyst can be more effectively used in the production of SWNTs.

Furthermore, it would be desirable to be able to control the diameters of the SWNTs produced by the catalytic method. The diameters of the SWNTs have important implications for their thermal, mechanical and electrical properties. Control of the diameters of the SWNTs will therefore result in better control of the physical properties of SWNTs.

DETAILED DESCRIPTION OF THE INVENTION

Figure 1:
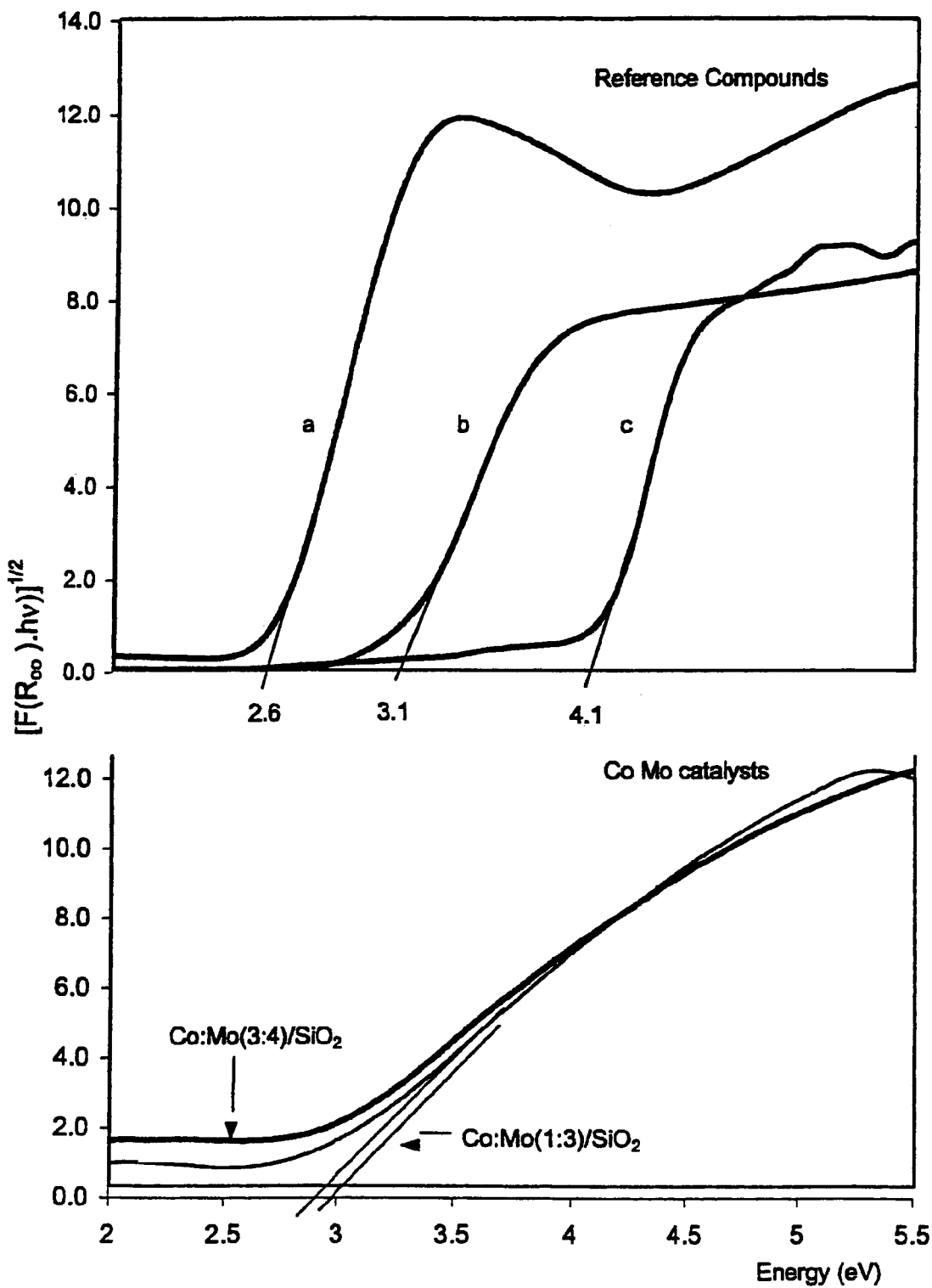
FIG. 1: Lower panel: UV absorption spectra for two Co:Mo/SiO$_2$ calcined catalysts. Upper panel: (a): MoO$_3$, (b): (NH$_4$)$_6$Mo$_7$O$_{24}$, (c): NaMoO$_4$ references.

The present invention is directed to a catalyst composition and methods of using the catalyst composition for selectively producing single walled carbon nanotubes (SWNTs). The present invention is further directed to methods for selectively producing SWNTs having diameters within a particular size range.

The catalyst composition preferably comprises Co and Mo disposed on a support material, preferably silica, wherein the majority of the Mo occurs as dispersed Mo oxide clusters on the support material and the majority of the Co occurs in a CoMoO$_4$-like phase with the Co therein primarily in an octahedral configuration, and wherein the CoMoO$_4$-like phase occurs substantially as a layer upon the dispersed Mo oxide clusters.

The method of forming single walled nanotubes comprises the steps of providing a catalyst as described herein, exposing the catalyst in a reactor to a carbon-containing gas such as CO at a predetermined temperature, and maintaining a CO$_2$ concentration in the reactor below a threshold (maximum) CO$_2$ concentration. Above this threshold, the conversion of ionic Co to metallic Co is inhibited and therefore interfering with the formation of SWNTs.

In the method describe herein, the majority of the single-walled carbon nanotubes thus formed have diameters within a predetermined range. For example, when the reaction temperature is between about 700° C. and 800° C. (for example at 750° C. and wherein the pressure of the system is preferably between about 1 atm to 7 atm), most of the SWNTs have diameters between 0.7 nm and 0.9 nm. When the reaction temperature is between about 800° C. and 900° C. (for example at 850° C. and wherein the pressure is preferably between about 1 atm to 7 atm), most of the SWNTs have diameters between about 0.9 nm and 1.2 nm. When the temperature is between about 900° C. and 1,000° C. (for example at 950° C. and wherein the pressure is preferably between about 1 atm to 7 atm), most of the SWNTs have diameters between about 1.3 nm and 1.7 nm. The threshold concentration of CO$_2$ is preferably 1% or less. Preferably before use, the catalyst is reduced, for example by exposure to H$_2$ gas at 500° C.

More preferably, the threshold CO$_2$ concentration, in order of increasing preference, is 0.9% CO$_2$, 0.8% CO$_2$, 0.7% CO$_2$, 0.6% CO$_2$, 0.5% CO$_2$, 0.4% CO$_2$, 0.3% CO$_2$, 0.2% CO$_2$ and 0.1% CO$_2$.

Catalyst Preparation and Pretreatment

A series of monometallic and bimetallic (Co—Mo) catalysts supported on silica was prepared by incipient wetness impregnation. The bimetallic samples, prepared by co-impregnation of aqueous ammonium heptamolybdate and Co nitrate solutions, had Co:Mo molar ratios of 2:1, 3:4, 1:2, and 1:3. In this series, the amount of Mo was kept constant for all catalysts at 4.6 wt %, while the amount of Co was varied accordingly. Three monometallic catalysts were prepared with loadings of 1.4 wt % Co, 0.02 wt % Co and 4.6 wt % Mo, respectively. The SiO$_2$ support obtained from ALDRICH had an average pore size of 6 nm, BET area 480 m$^2$/g, pore volume 0.75 cm$^3$/g, and particle sizes in the range 70-230 mesh. After impregnation, the solids were dried overnight at 120° C. and then calcined for 3 h at 500° C. in flowing dry air.

The catalysts were investigated in three different forms, the oxidic state, the reduced state, and the reacted (spent) state. The catalyst in the oxidic state was treated by calcination in air at 500° C. The catalyst in the reduced state was first calcined in air at 500° C., then reduced by H$_2$ flow for 1 h at 500° C. and finally heated in He flow to 700° C. The catalyst in the reacted (spent) state was catalyst which had been used to a point wherein SWNTs had been produced.

Catalyst Characterization

UV/Vis spectra of the solid samples were recorded using a SHIMADZU double beam spectrometer UV-2101 with an integrating sphere for diffuse reflectance. Barium sulfate was used as reflectance standard. Several Mo and Co compounds, including MoO$_3$, Na$_2$MoO$_4$, (NH$_4$)$_6$Mo$_7$O$_{24}$.4H$_2$O and α-CoMoO$_4$ were used as references. Before each analysis, the samples were dried in air at 120° C.

The IR spectra of adsorbed NO were obtained on a BIO-RAD FTS 40 spectrometer, equipped with a diffuse reflectance cell (HARRICK SCIENTIFIC CO. PRAYING MANTIS) with an in-situ reaction chamber. Before the spectrum was acquired, the catalysts were reduced ex-situ under H$_2$ flow at 500° C. for 1 h and then heated up in He to 700° C. using a ramp temperature of 10° C./min. Then they were cooled down to room temperature in He flow and transferred to the IR cell. To eliminate any superficial oxidation caused by exposure to air during the transfer, each sample was re-reduced in situ for 1 h at 500° C. in H$_2$ flow, purged in He flow at that temperature, and then cooled down to room temperature. Once cooled, the samples were exposed to 3% NO in He for 30 min at room temperature and purged in He for 30 min.

X-ray absorption data were obtained at the National Synchrotron Light Source (NSLS) at Brookhaven National Laboratory, using beam line X-18B equipped with a Si (111) crystal monochromator. The X ray ring at the NSLS has an energy of 2.5 GeV and ring current of 80-220 mA. The calcined, reduced and spent samples were investigated by X-ray absorption. Both reduced and spent samples were not exposed to air, but were directly transferred from the reaction chamber to a He glove bag, where they were wrapped in KAPTON tape and stored in He-purged sealed veils until analysis. The EXAFS experiments were conducted in a stainless steel sample cell at liquid nitrogen temperature. Six scans were recorded for each sample. The average spectrum was obtained by adding the six scans. The pre-edge background was subtracted by using power series curves. Subsequently, the post-edge background was removed using a cubic spline routine.

The spectra were normalized by dividing by the height of the absorption edge. To obtain structural parameters, theoretical references for Co—Co, Co—O, Mo—O, Mo—C, Mo—Mo and Co—Mo bonds were obtained by using the FEFF and FEFFIT fitting programs from the University of Washington (Rehr, J. J., Zabinsky, S. I., and Albers, R. C., Phys. Rev. Lett. 69, 3397 (1992)). In this routine, the Debye Waller factors for each bond type (s), the edge energy difference (DEo), the coordination number N, and the difference in bond distances (DR) with respect to the theoretical reference, were used as fitting parameters. The quality of the fit was determined using the r-factor, which gives a sum-of-squares measure of the fractional misfit. Therefore, the smaller the r-factor, the better the fit is. For good fits, the r-factor is always less than or about 3%. The spectra of $MoO_3$, $Na_2MoO_4$, $(NH_4)_6Mo_7O_{24}$, CoO, $Co_3O_4$ and α-$CoMoO_4$ were also obtained at liquid nitrogen temperature and used as references.

X-ray photoelectron spectroscopy data were recorded on a PHYSICAL ELECTRONICS PHI 5800 ESCA System with monochromatic AIK α X-rays (1486.6 eV) operated at 350 W and 15 kV with a background pressure of approximately 2.0×10-9 Torr. A 400 μm spot size and 58.7 eV pass energy were typically used for the analysis. Sample charging during the measurements was compensated by an electron flood gun. The electron takeoff angle was 45° with respect to the sample surface. The pretreatment of the samples was performed in a packed bed micro-reactor with an on/off valve at each end of the reactor, which allowed for a quick isolation of the samples after each treatment.

The reactor with the sample under He was transferred to a glove bag; the sample (in powder form) was placed on a stainless steel holder and kept in a vacuum transfer vessel (Model 04-110A from PHYSICAL ELECTRONICS) to avoid any exposure to the atmosphere before the analysis. For each sample, the binding energy regions corresponding to Si (95-115 eV), Mo (220-245 eV) and Co (760-820 eV) were scanned. The binding energies were corrected by reference to the C(1s) line at 284.8 eV. A non-linear Shirley-type background was used for the area analysis of each peak. The fitting of the XPS spectra was carried out with asymmetric peaks, using the MULTIPAK software from PHYSICAL ELECTRONICS.

$H_2$-TPR experiments were conducted passing a continuous flow of 5% $H_2$/Ar over approximately 30 mg of the calcined catalyst at a flow rate of 10 $cm^3$/min while linearly increasing the temperature at a heating rate of 8° C./min. The hydrogen uptake as a function of temperature was monitored using a thermal conductivity detector, SRI Model 110 TCD.

Production and Characterization of Carbon Nanotubes

The production of SWNTs by CO disproportionation was compared in a series of catalysts with Co:Mo ratios of 2:1, 1:2 and 1:3. For SWNTs production, 0.5 g of calcined (acidic) catalyst was placed in a horizontal tubular reactor, heated with $H_2$ up to 500° C., and then heated by He flow up to 700° C. Subsequently, CO was introduced at a flow rate of 850 $cm^3$/min at 84 psi and kept under these conditions for a given period of time, which ranged from 3 to 120 minutes. At the end of each run, the system was cooled down by He flow. The total amount of carbon deposits was determined by temperature programmed oxidation (TPO) following the method of Kitiyanan et al. (Kitiyanan, B., Alvarez, W. E., Harwell, J. H., and Resasco, D. E., Chem. Phys. Lett. 317, 497 (2000)). Transmission electron microscopy (TEM) was used for characterizing the carbon deposits on the catalyst. The TEM images were obtained in a JEOL JEM-2000FX TEM. For this analysis, a suspension of the carbon-containing samples in isopropanol was achieved by stirring the solid sample with ultrasound for 10 min. Then, a few drops of the resulting suspension were deposited on a grid and subsequently evacuated before the TEM analysis.

RESULTS

Characterization of the Calcined (Oxidic) Catalysts

EXAMPLE 1

Diffuse Reflectance UV-Visible Spectroscopy (UV/V-DRS)

UV/V-DRS were used to study the state of both Mo and Co in the oxidic form, after calcination in air at 500° C. In order to estimate the band energy gap of the Mo oxide compounds, it has been recommended to use the square root of the Kubelka-Munk function multiplied by the photon energy, and plot this new function versus the photon energy. The position of the absorption edge can then be determined by extrapolating the linear part of the rising curve to zero.

The values thus obtained carry information about the average domain size of the oxide nanoparticles. It has been shown that the energy band gap decreases as the domain size increases. Therefore, a comparison can be made between the energy of the samples under investigation and those of references of known domain size. This comparison is made in FIG. 1, which shows the absorption edges of several $MoO_x$ species together with those of two different Co:Mo/$SiO_2$ catalysts. As expected, the band gap energies in the reference series decrease as the domain size increases. Those of the Co:Mo/$SiO_2$ catalysts lie between those of $(NH_4)6Mo_7O_{24}$ and $MoO_3$. From this comparison, it can be inferred that the Mo species in the (oxidic) calcined catalysts have relatively small domain sizes. The presence of a small contribution of $MoO_3$ species could not be ruled out since a small tail can be observed below 3.0 eV, but most of the Mo is in a high state of dispersion.

Figure 2:
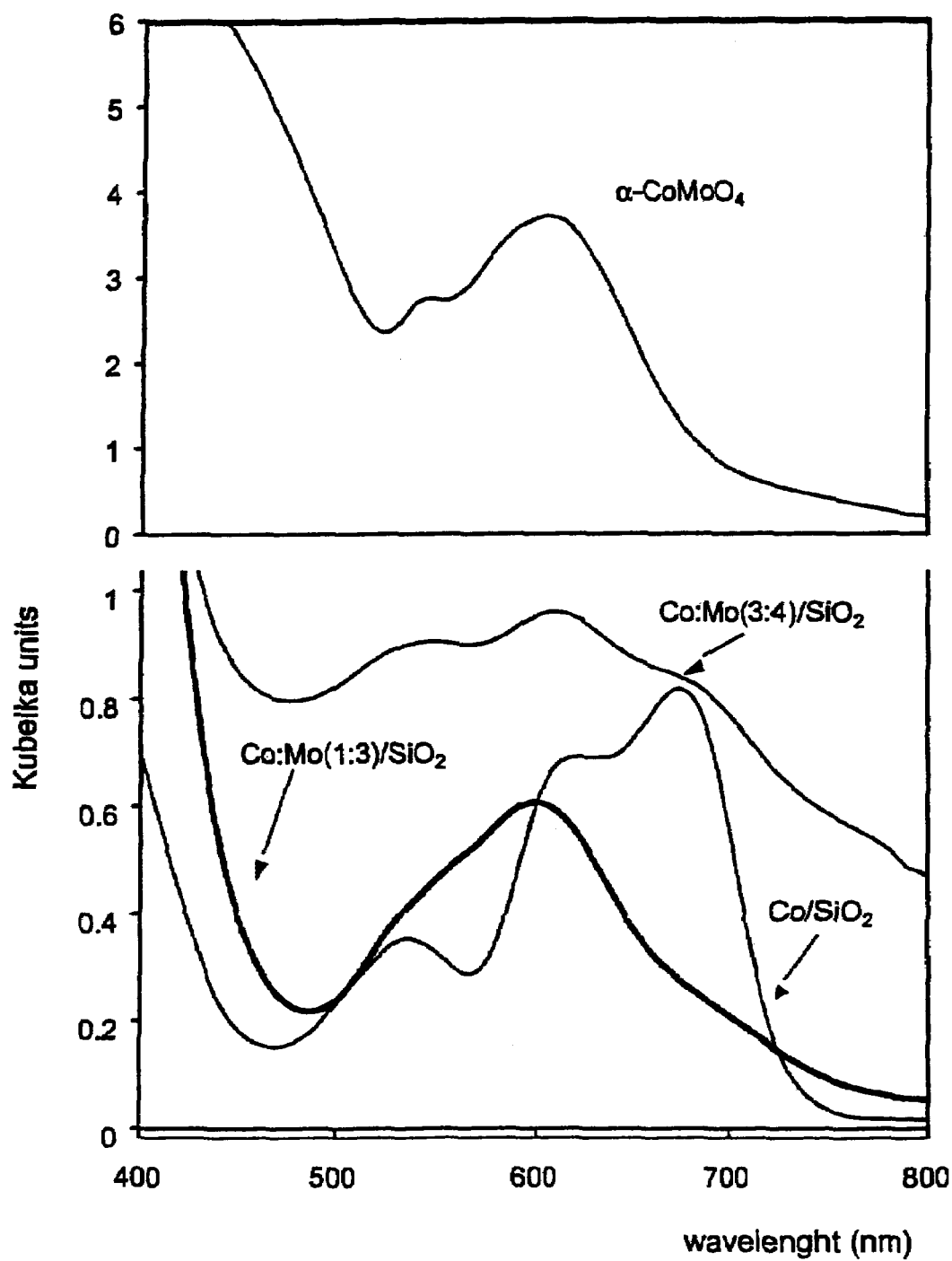
FIG. 2: Visible spectra for two calcined (oxidic) bimetallic Co:Mo/SiO$_2$ catalysts with different Co:Mo ratios(1:3 and 3:4) and that for a monometallic Co(0.02% wt)/SiO$_2$. The spectrum of an α-CoMoO$_4$ reference is included for comparison.

In addition to the charge-transfer bands due to Mo, appearing in the UV region, the visible spectra of the bimetallic catalysts present bands in the 500-750 nm region, which did not appear for the Mo/$SiO_2$ catalyst. These bands are associated with Co species and have previously been ascribed to d-d transitions ($^4T_{2g}$ $^4A_{2g}$ and $^4T_{2g}$ $^4T_{1g}$ (P)) of high spin octahedral Co complexes. FIG. 2 shows the DRS spectra in this region for three calcined (oxidic) catalysts, Co:Mo(3:4)/$SiO_2$, Co:Mo(1:3)/$SiO_2$ and Co/$SiO_2$. The spectrum for the Co:Mo(1:3) catalyst is very similar to that of α-$CoMoO_4$, which is typical of Co in an octahedral environment. The spectrum for the Co:Mo(1:2) was almost identical to that of the Co:Mo(1:3) catalyst, so only one of them is included in the graph.

By contrast, the shape of the spectrum of the Co:Mo (3:4)/$SiO_2$ catalyst was markedly different and exhibited the appearance of a band at around 680 nm. This band was in turn the dominant feature in the pure Co catalyst and should be associated with $CO_3O_4$ species, which as shown below, are present in the pure Co catalyst in the calcined state. Therefore, it can be concluded that the catalysts with low Co:Mo ratio exhibit most of the Co interacting with Mo. However, as the Co:Mo ratio increases, free Co oxide begins to appear. In fact, the spectrum of the Co:Mo(3:4)/$SiO_2$ catalyst can be rationalized as a sum of contributions from two types of species, one interacting with Mo (main band at around 600 nm) and a second one in which the Co oxidic species are segregated and not interacting with Mo (main band at 680 nm). Similar conclusions have been previously drawn from Raman spectroscopy and XRD data, which indicated that a non-interacting Co phase is formed on Co-Mo/SiO$_2$ catalysts at high Co:Mo ratios (Jeziorowski, H., Knozinger, H., Grange, P., and Gajardo, P., J. Phys. Chem. 84, 1825 (1980)).

EXAMPLE 2

X-ray Absorption Spectroscopy (EXAFS/XANES)

Figure 3:
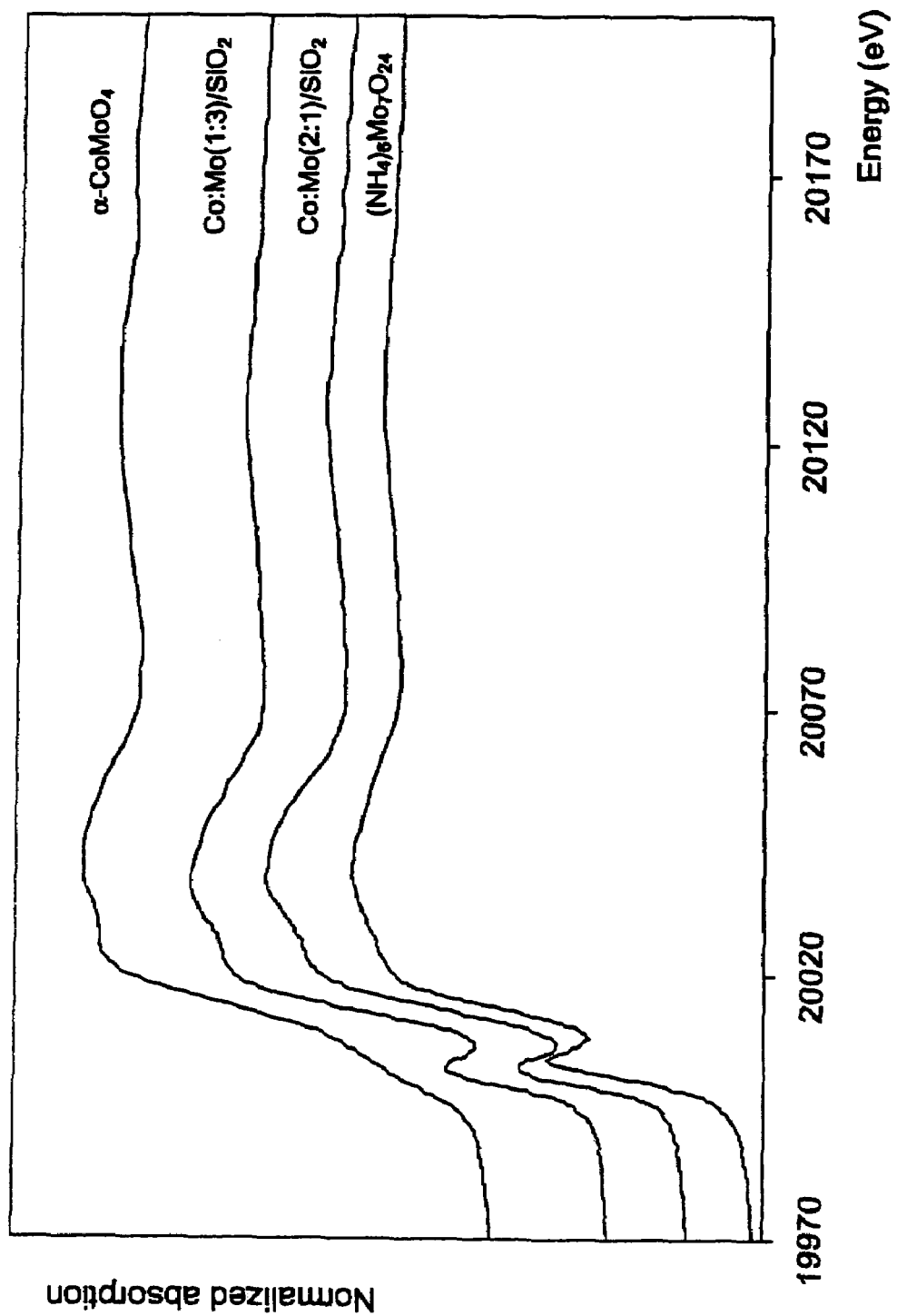
FIG. 3: Mo-edge (20,000 eV) XANES of two CoMo calcined (oxidic) catalyst compared to α-CoMoO$_4$ and (NH$_4$)$_6$Mo$_7$O$_{24}$ references.

FIG. 3 shows the K-edges of Mo (E=20000 eV) for two different calcined (oxidic) catalysts with Co:Mo molar ratios of 2:1 and 1:3. Absorption spectra for the two reference compounds, α-CoMoO$_4$ and ammonium heptamolybdate, have been included for comparison. The absorption edges for both catalysts are remarkably similar. They both exhibit a pre-edge feature, which is also observed in the spectrum of ammonium heptamolybdate. This pre-edge feature is typically observed in distorted octahedral environments, such as that found in the heptamolybdate. It is due to a 1s 4d bound-state transition that in the case of a perfect octahedral geometry is formally forbidden. Accordingly, it is barely present in compounds such as MoO$_3$ and α-CoMoO$_4$. However, it becomes allowed when the d-states of the metal mix with the p orbitals of the ligand, as in compounds with distorted octahedral symmetries. Of course, a pre-edge feature is always observed in Mo species with tetrahedral symmetry, such as in Na molybdate. However, in such cases the feature is much more pronounced than that observed in the present case. Therefore, it can be concluded that in the bimetallic catalysts, Mo is mostly in a structure similar to that of the heptamolybdate. Interestingly, this is the same for both, the Co:Mo(2:1) and Co:Mo(1:3) samples.

Figure 4:
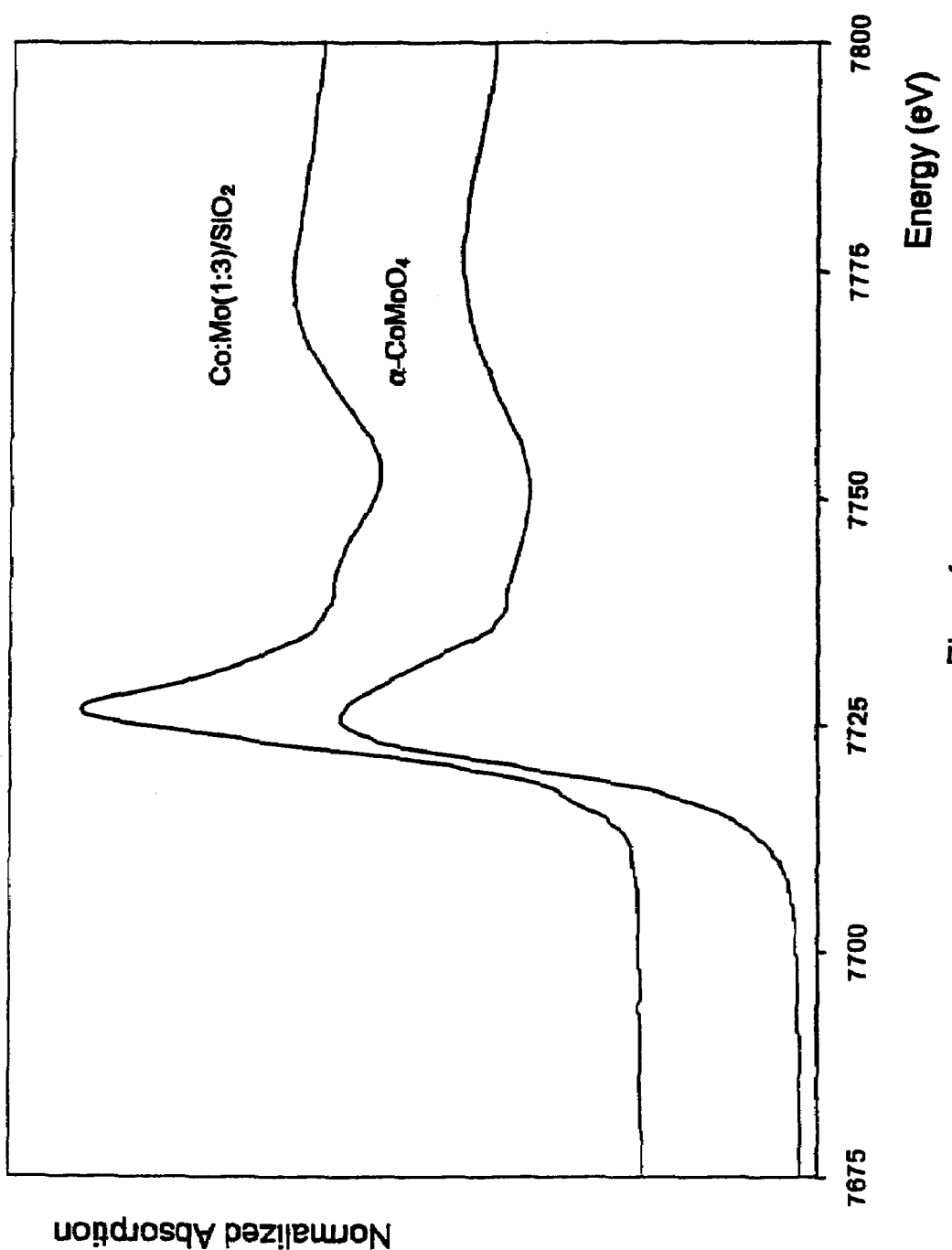
FIG. 4: Co K edge (7,719 eV) XANES of calcined Co:Mo(1:3)/SiO$_2$ catalyst compared to α-CoMoO$_4$ used as a reference.

Next, the set of samples were investigated at the Co edge. FIG. 4 compares the XANES spectra for the K-edge of Co (Eo=7709 eV) in the calcined (oxidic) Co:Mo(1:3)/SiO$_2$ catalyst and that in the α-CoMoO$_4$ reference. Except for some differences in the size and shape of the first peak in the edge, both spectra look remarkably similar. By contrast, the Co edge for the Co:Mo (2:1) catalyst, containing excess Co, is very different from that of the α-CoMoO$_4$ reference.

Figure 5:
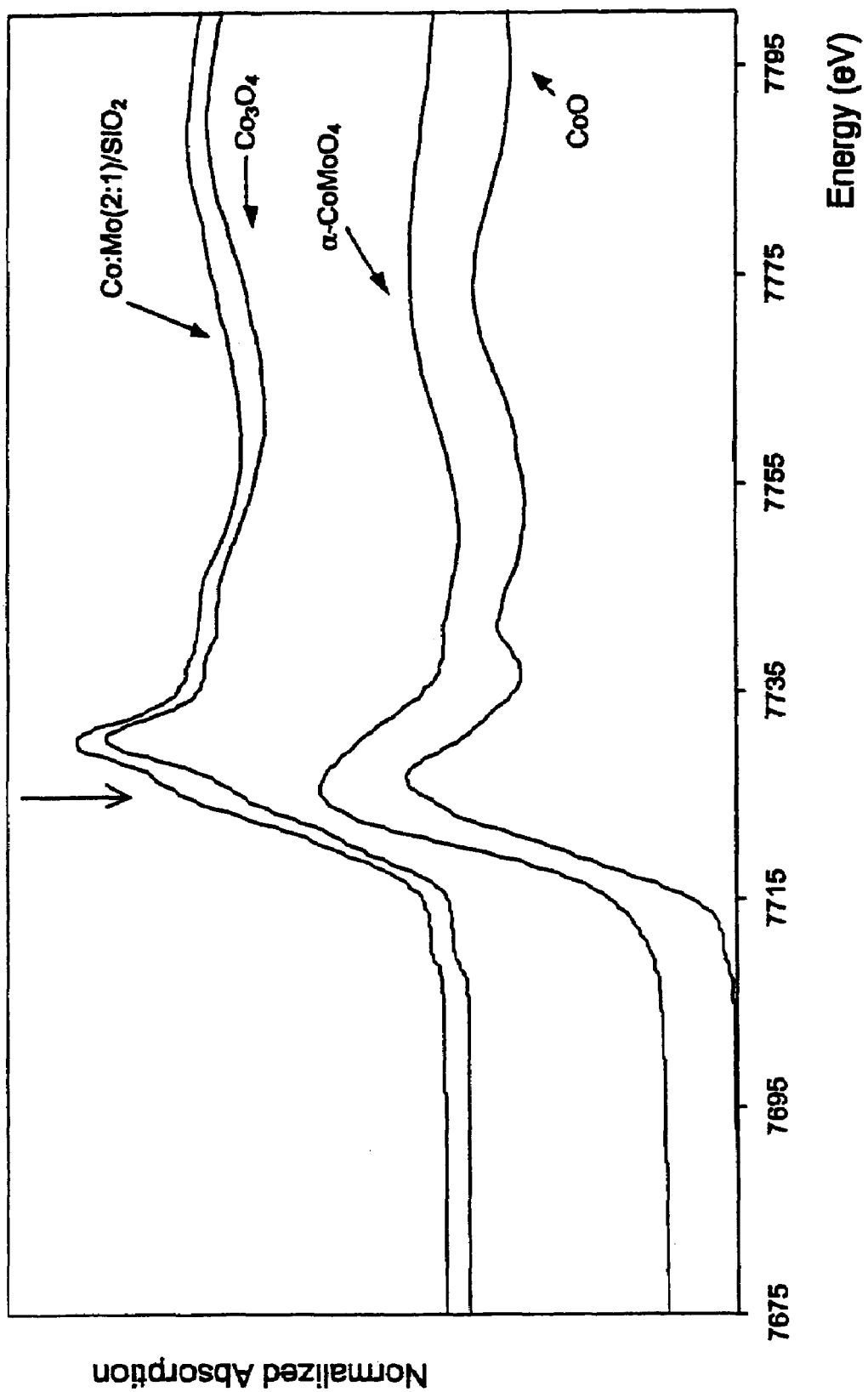
FIG. 5: Co K edge XANES of a calcined Co:Mo(2:1)/SiO$_2$ catalyst compared to those of α-CoMoO$_4$, CoO and Co$_3$O$_4$ references.
Figure 6:
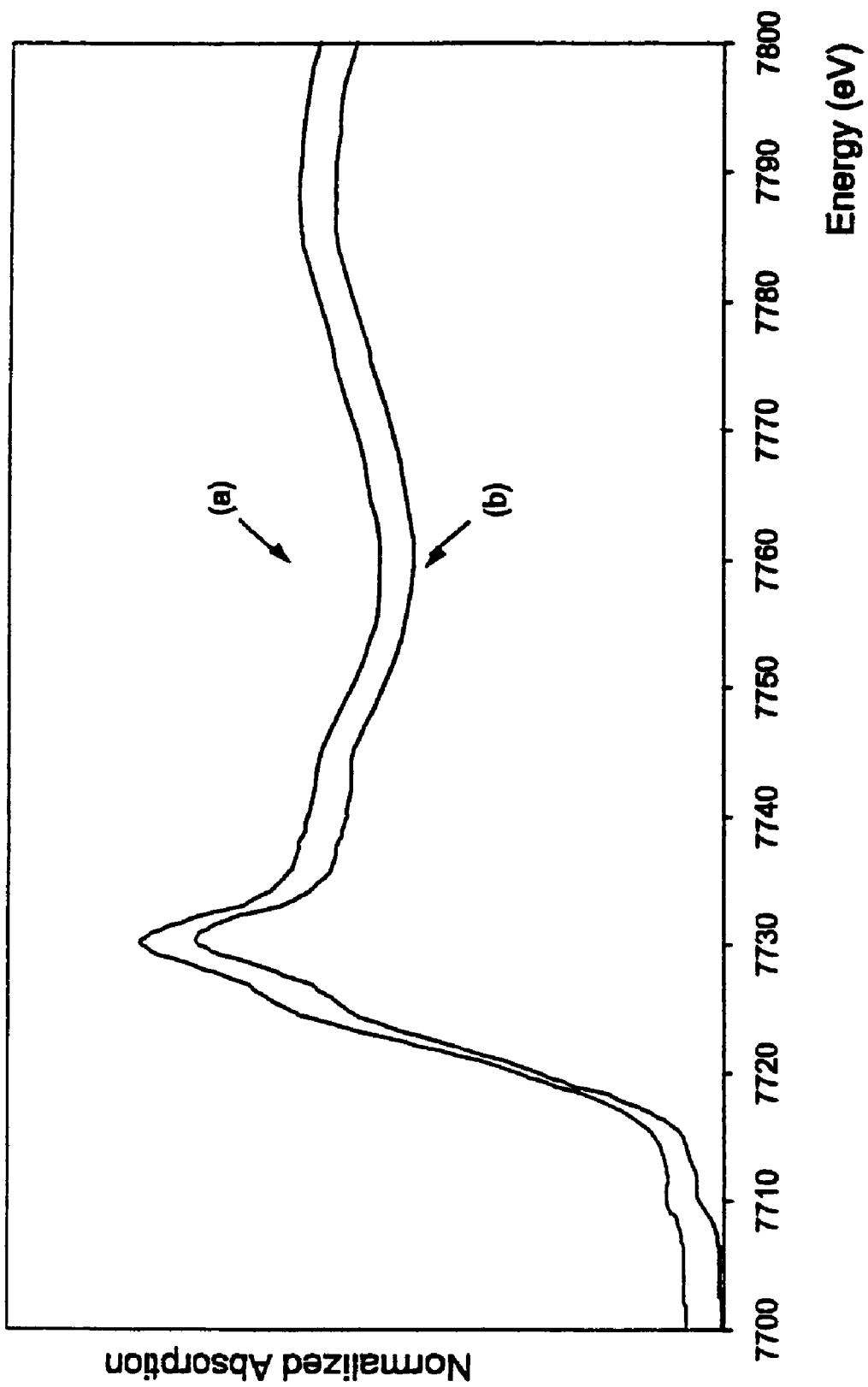
FIG. 6: Co K edge XANES of a calcined Co:Mo(2:1)/SiO$_2$ catalyst (curve a) and a weighted linear combination of XANES from α-CoMoO4 and CO$_3$O4 (curve b). The contributions resulting from the best fit and were 82% CO$_3$O$_4$ and 18% α-CoMoO4.
Figure 7:
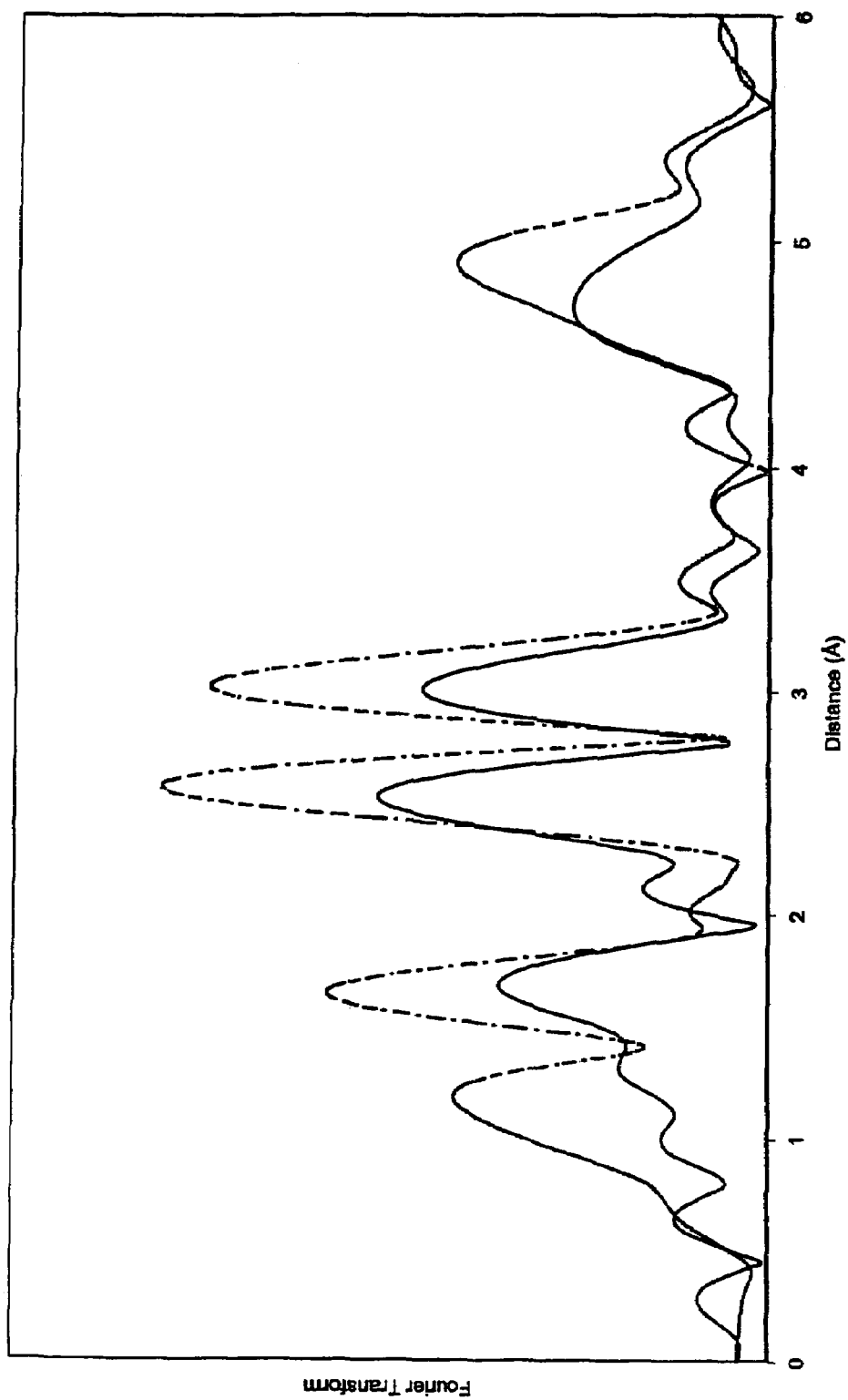
FIG. 7: Fourier transforms of the k$^3$ EXAFS data of the Co K edge obtained on the calcined Co:Mo(2:1)/SiO$_2$ catalyst (solid line) and for CO$_3$O$_4$ reference (dotted line).

As shown in FIG. 5, the XANES of the catalyst is in fact very similar to that of CO$_3$O$_4$, although a small shoulder appearing at around 7726 eV is more pronounced for the catalyst than for the oxide. Interestingly, this shoulder coincides with the white line of CoMoO$_4$ and CoO species. A first approximation of a XANES composed of two different phases can be obtained by simple addition of the XANES of the individual components. A simple fitting with a linear combination of contributions from CO$_3$O$_4$ and CoMoO$_4$ reproduces the XANES spectrum of the Co:Mo (2:1) catalyst (see FIG. 6). This comparison indicates that in the catalyst with Co excess, most of the Co is in the form of CO$_3$O$_4$ and a small fraction as CoMoO$_4$. When the fitting was attempted using CoO as a third component, the best fit did not include any contribution of this oxide. The EXAFS data was in good agreement with the conclusions reached from XANES analysis. As shown in FIG. 7, the Fourier Transform for the calcined (oxidic) Co:Mo (2:1) catalyst is very similar to that of CO$_3$O$_4$, indicating that this oxide is the predominant form present when Co is in excess.

Figure 8:
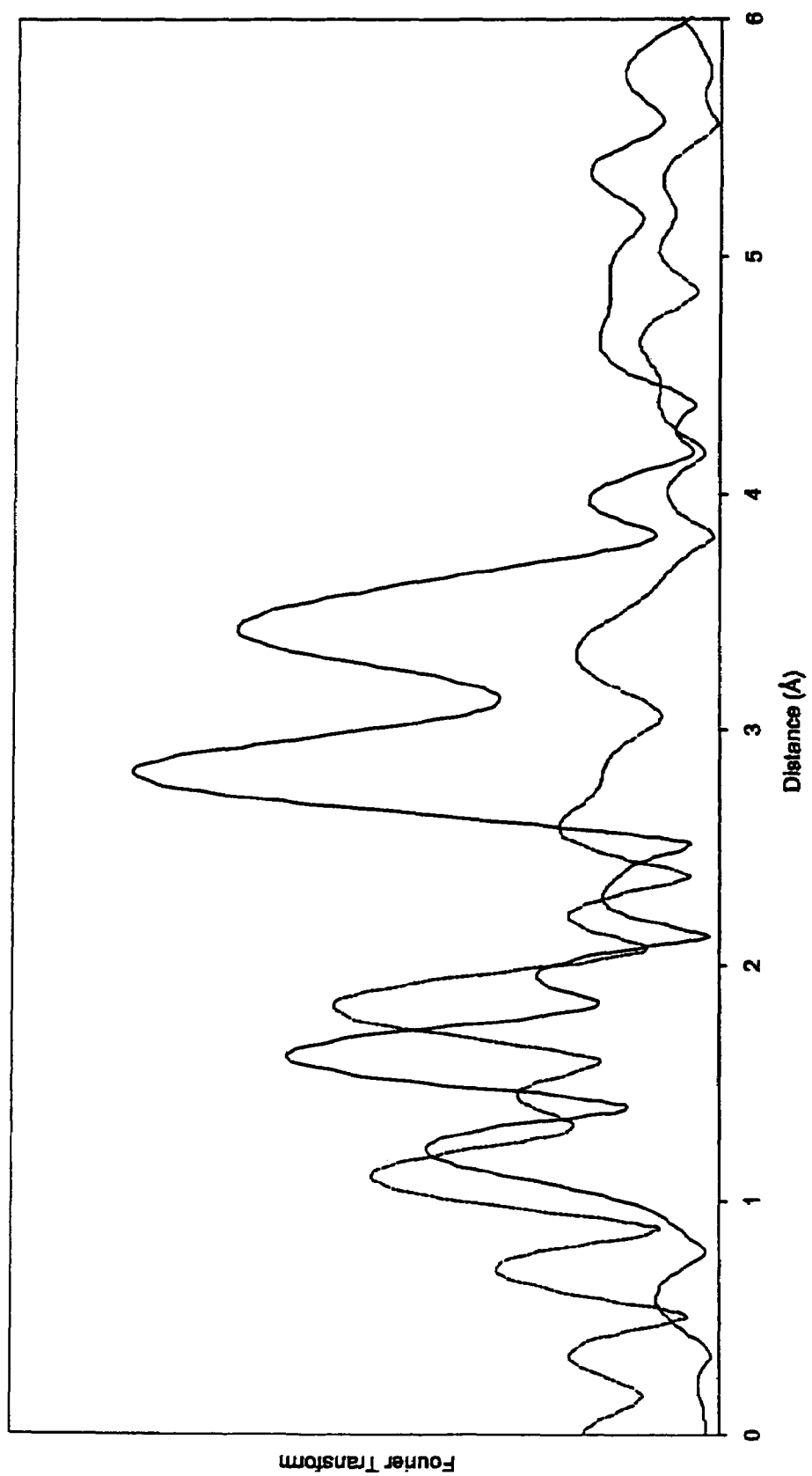
FIG. 8: Fourier transforms of the k$^3$ EXAFS data of the Co K edge, obtained on the calcined Co:Mo(1:3)/SiO$_2$ catalyst (dotted line) and on a α-CoMoO$_4$ reference (solid line).

The results of the sample having a low Co:Mo ratio require some further consideration. It is interesting to note that while the XANES spectra for these catalysts look similar to that of α-CoMoO$_4$ from the Co side, they bear no resemblance with this compound from the Mo side. One may rationalize this contrasting behavior by proposing that while most of the Co in the catalyst is forming a CoMoO$_4$-like phase only a fraction of Mo participates in this compound. The rest of the Mo would occur as dispersed Mo oxide clusters. Apparently the Co is in a CoMoO$_4$-like phase because the XANES indicates that the local environment of Co in the Co:Mo(1:3) catalyst is very similar to that in CoMoO$_4$, but the EXAFS data are significantly different from that of the compound. This comparison is made in FIG. 8, which shows the Fourier Transforms for the K-edge of Co in the calcined (oxidic) Co:Mo(1:3)/SiO$_2$ catalyst, together with that of α-CoMoO$_4$. The low intensity observed in the catalyst for the peaks between 2.5 and 4 Å, clearly observable for the Co molybdate, would indicate that bulk α-CoMoO$_4$ is not present, but rather a highly dispersed CoMoO$_4$-like structure, co-existing with Mo oxide clusters.

EXAMPLE 3

Temperature Programmed Reduction (TPR)

Figure 9:
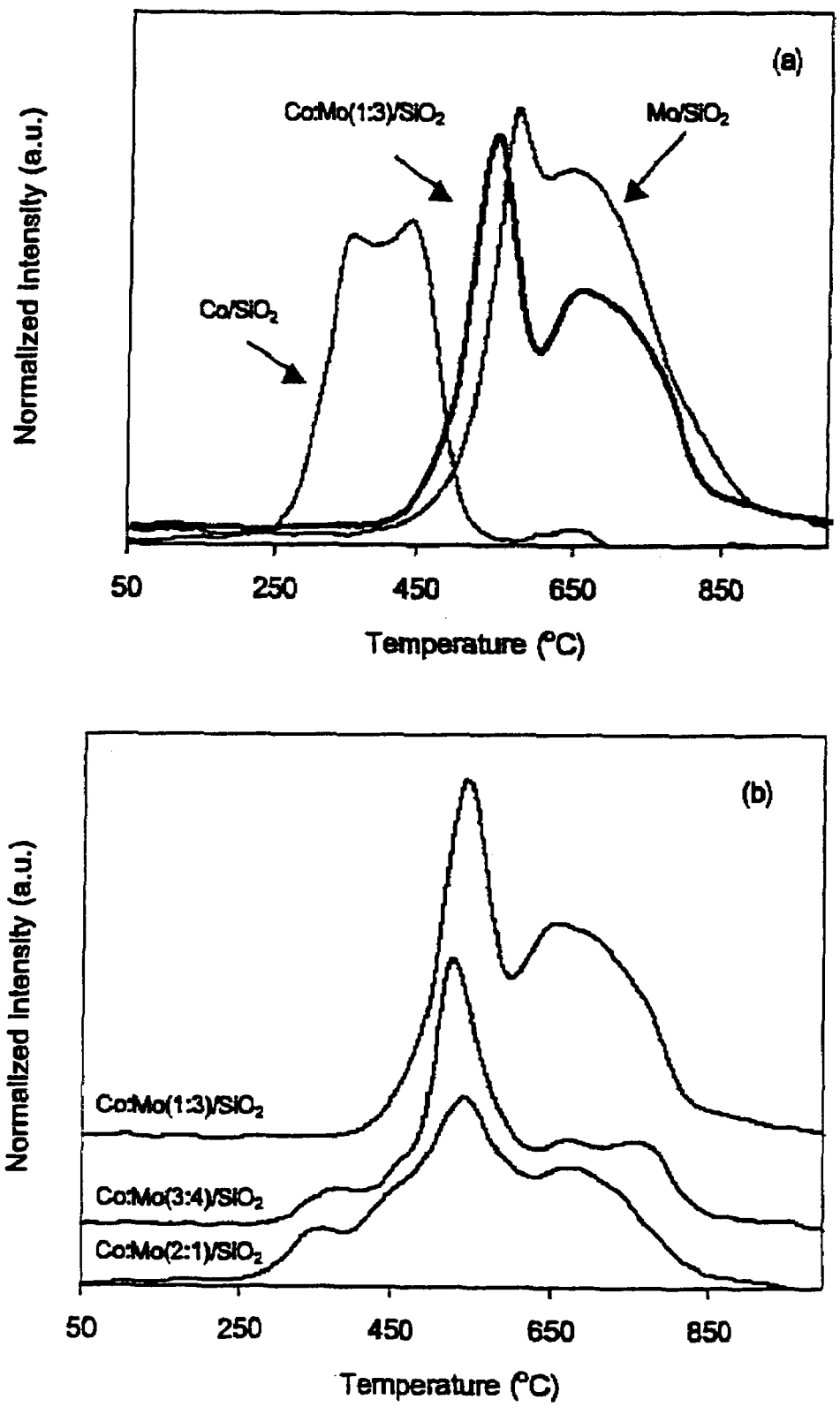
FIG. 9: TPR profiles of several mono and bimetallic cobalt/molybdenum catalysts. The TPR was conducted with 5% H$_2$/Ar at a heating rate of 8° C./min.

The reduction profiles of calcined monometallic Co/SiO$_2$ and Mo/SiO$_2$ catalysts together with that of the bimetallic Co:Mo (1:3)/SiO$_2$ catalyst are shown in FIG. 9 (upper panel). The TPR profile of the Co monometallic catalyst shows two peaks at 360° C. and 445° C., which can be ascribed to the reduction of Co oxide species. The reduction of the monometallic Mo catalyst also exhibits two peaks, but they appear at much higher temperatures than those of Co. Therefore, from the reduction profiles it is possible to identify the presence of Co and Mo species in the absence of interactions. Accordingly, the TPR of the bimetallic Co:Mo (1:3)/SiO$_2$ catalyst indicates that, in this sample, the vast majority of Co oxide species are interacting with Mo.

It is clear that while most of the Co in the monometallic catalyst gets reduced below 500° C., almost no reduction takes place below that temperature in the bimetallic catalyst. In a previous work it was reported that the reduction of interacting Co—Mo supported species occurs at similar temperatures as those assigned for the reduction of free Mo species. It has also been proposed that the addition of Mo oxide to Co oxide inhibits the reduction of the Co species because Mo$^{6+}$ polarizes the Co—O bonds, making them more ionic and consequently more difficult to reduce. In agreement with the DRS and EXAFS/XANES data, TPR indicates that a high degree of Co—Mo interaction is only observed for the catalyst with a low Co:Mo ratio. As shown in FIG. 9 (lower panel), as the Co:Mo ratio increases, a gradually increasing fraction of segregated Co species is apparent from the peaks at 360° C. and 445° C., which are associated with the reduction of non-interacting Co oxide.

EXAMPLE 4

Diffuse Reflectance Infrared Fourier Transform Spectroscopy (DRIFTS)

The vibrational spectrum of adsorbed NO was used to investigate the Co:Mo/SiO$_2$ catalysts after the reduction pretreatment in H$_2$ at 500° C. As mentioned above, both Co and Mo are able to adsorb NO at room temperature, exhibiting characteristic IR absorption bands that can be used to identify the NO adsorption on each metal. It is generally agreed that Mo$^{VI}$ does not adsorb NO, but Mo$^{II}$, Mo$^{III}$ and Mo$^{IV}$ have all been suggested as potential NO adsorption sites. Similarly, both oxidic and reduced Co catalysts are able to adsorb NO. It has been reported that adsorption on reduced Co results in bands at slightly lower frequencies than on oxidized Co. However, it is not always possible to determine the chemical state of Co based on NO adsorption. Therefore, although DRIFTS of adsorbed NO may not be the best technique to characterize the chemical state of Co and Mo, it is certainly a powerful tool to quantify the degree of site blocking of one of the two components by the other.

Figure 10:
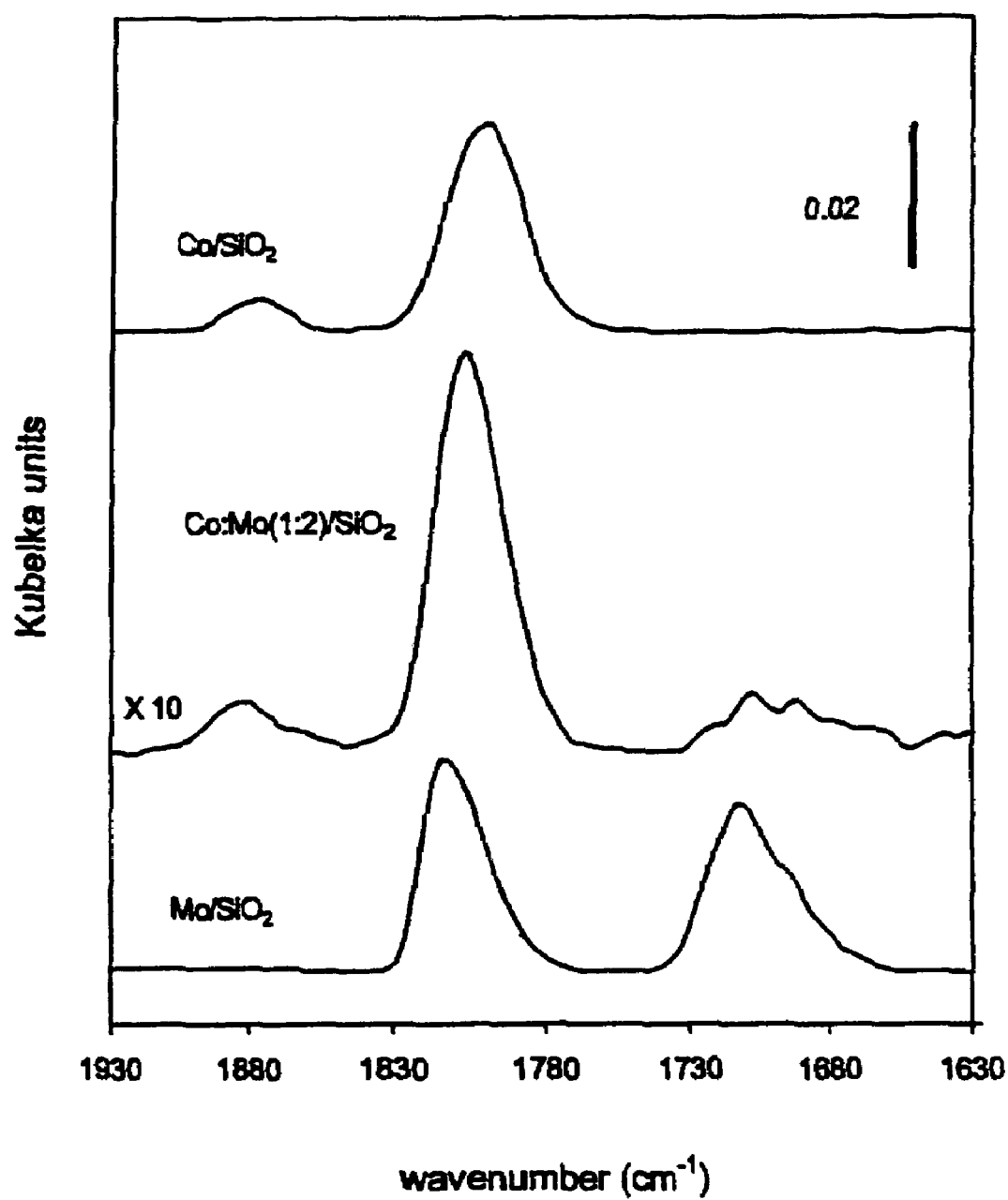
FIG. 10: IR spectra of NO adsorbed on reduced monometallic (Mo/SiO$_2$ and Co/SiO$_2$) and bimetallic (Co:Mo/SiO$_2$) catalysts. The catalysts were reduced under hydrogen at 500° C.

FIG. 10 shows the DRIFTS spectrum of NO adsorbed on two reduced monometallic catalysts with 4.6 wt % Mo and 1.4 wt % Co, respectively, and a reduced bimetallic catalyst with 4.6 wt % Mo and 1.4 wt % Co (Co:Mo=1:2). On the monometallic Mo/SiO$_2$ catalyst the bands corresponding to the symmetric and anti-symmetric stretching modes of dinitrosyl species are clearly observed. The symmetric mode exhibited a band at 1814 cm$^{-1}$, while the anti-symmetric mode generated a broad band centered at around 1714 cm$^{-1}$. The broadening of the anti-symmetric band has been attributed to inhomogeneities on the surface that influence the vibrational transition moment of the asymmetric mode more than the moment of the symmetric mode. For the monometallic Co/SiO$_2$ catalyst, the bands of the dinitrosyl species appeared at significantly higher wavenumbers (1880 and 1803 cm$^{-1}$) than those on Mo. In this case, the anti-symmetric mode is the dominant band in the spectrum. Finally, the bimetallic Co:Mo(1:2)/SiO$_2$ catalyst showed three absorption bands that roughly correspond to those of the individual components. The dominant band appearing at 1806 cm$^{-1}$ obviously has contributions from both the symmetric band of NO adsorbed on Mo and the anti-symmetric band of NO adsorbed on Co. A smaller band appeared at 1883 cm$^{-1}$, which can be associated with the symmetric mode on Co sites and a broader band, which may include several individual bands, appeared in the region 1730-1650 cm$^{-1}$ and can only be associated to adsorption on Mo.

The appearance of different components associated with this asymmetric-mode band in the bimetallic catalyst contrasting to that on Mo/SiO$_2$ catalyst, could be explained in terms of Mo sites with different degrees of coordinative unsaturation, or alternatively, in terms of sites where Mo is influenced by Co to various degrees. It is also interesting to note that the overall intensity of the bands of the bimetallic Co—Mo catalysts is consistently much lower than that of the monometallic Co and Mo catalyst. This effect has been previously observed for alumina-supported Co—Mo catalysts. In that case, a lower dispersion of the active species on the bimetallic catalysts, compared to that of the monometallic ones, was made responsible for the observed loss in intensity.

Figure 11:
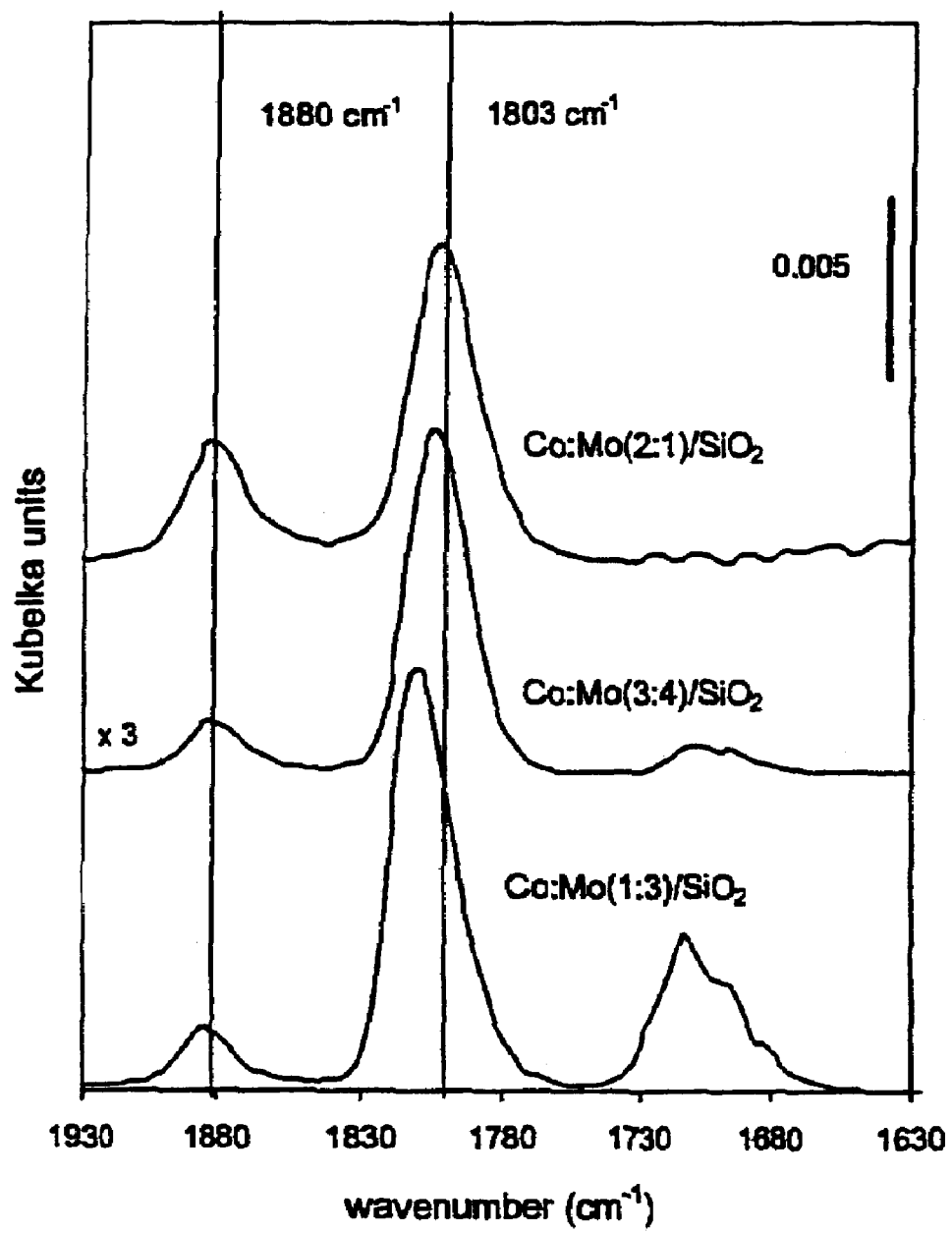
FIG. 11: IR bands of NO adsorbed on (a) Co:Mo(2:1)/SiO$_2$, (b) Co:Mo(3:4)/SiO$_2$, and (c) Co:Mo(1:3)/SiO$_2$. The catalysts were reduced under hydrogen at 500° C.

FIG. 11 shows the FTIR spectra of NO adsorbed on different reduced bimetallic catalysts, in which the Mo content was kept constant while the Co content was increased. It is clear that as the Co content increases the adsorption of NO over the Mo sites is inhibited. A similar effect has been previously reported for the sulfided Co:Mo/Al$_2$O$_3$ catalyst and interpreted as a blockage of Mo sites by Co. Since the low-frequency anti-symmetric NO stretching on Mo does not have contributions from species adsorbed on Co, it can be used as an indication of the density of Mo sites covered by Co. A clear decrease in the intensity of this band is observed as the Co:Mo ratio increases, becoming practically negligible when Co is in excess, e.g. for a Co:Mo ratio of 2:1. At the same time, the bands for this catalyst appear at the same wavelengths as those on the monometallic Co catalyst, i.e. 1880 and 1803 cm$^{-1}$. A straightforward conclusion drawn from these observations is that when Co is in excess, it almost completely covers the Mo sites and forms a non-interacting species.

EXAMPLE 5

X-ray Photoelectron Spectroscopy (XPS)

XPS can be used to determine the chemical nature of the catalyst constituents and to roughly estimate their distribution on the surface. For the first purpose, the binding energy of the catalysts can be compared to those of reference compounds. In Table 1, the binding energies of the Co 2p$_{3/2}$ and Mo 3d$_{5/2}$ levels obtained for the catalysts in the reduced state are compared to those of the reference compounds. The spectra corresponding to the Co 2p$_{3/2}$ levels for all the catalysts can be described in terms of two contributions, one appearing at about 778 eV and other at 781.5 eV. As shown in the Table 1, these binding energies are in good correspondence with the binding energies that were obtained for the metallic Co (778.2 eV) and the CoMoO$_4$ (781.4 eV) references, respectively. Similar values for these reference materials have been previously reported in the literature.

TABLE 1

Binding energies for reduced catalysts and reference compounds.

| | Binding Energies (eV) | |
|---|---|---|
| | Mo 3d$_{5/2}$ | Co 2p$_{3/2}$ |
| Reference Samples | | |
| Co | | 778.2 |
| CoO | | 780.5 |
| Co$_3$O$_4$ | | 780.1 |
| a-CoMoO$_4$ | 232.5 | 781.4 |
| MoO$_3$ | 232.4 | |
| MoO$_2$ | 229.1 | |
| (NH$_4$)$_6$Mo$_7$O$_{24}$•4H$_2$O | 232.3 | |
| Reduced Catalysts | | |
| Mo/SiO$_2$ | 229.2 | |
| | 231.0 | |
| | 233.4 | |
| Co:Mo(1:3)/SiO$_2$ | 228.9 | 778.1 |
| | 231.1 | 781.5 |
| | 233.9 | |
| Co:Mo(1:2)/SiO$_2$ | 228.3 | 777.9 |
| | 230.8 | 780.7 |
| | 233.3 | |
| Co:Mo(3:4)/SiO$_2$ | 228.9 | 778.5 |
| | 230.8 | 781.5 |
| | 233.1 | |
| Co:Mo(2:1)/SiO$_2$ | 228.7 | 778.4 |
| | 230.9 | 781.4 |
| | 233.2 | |

Figure 12:
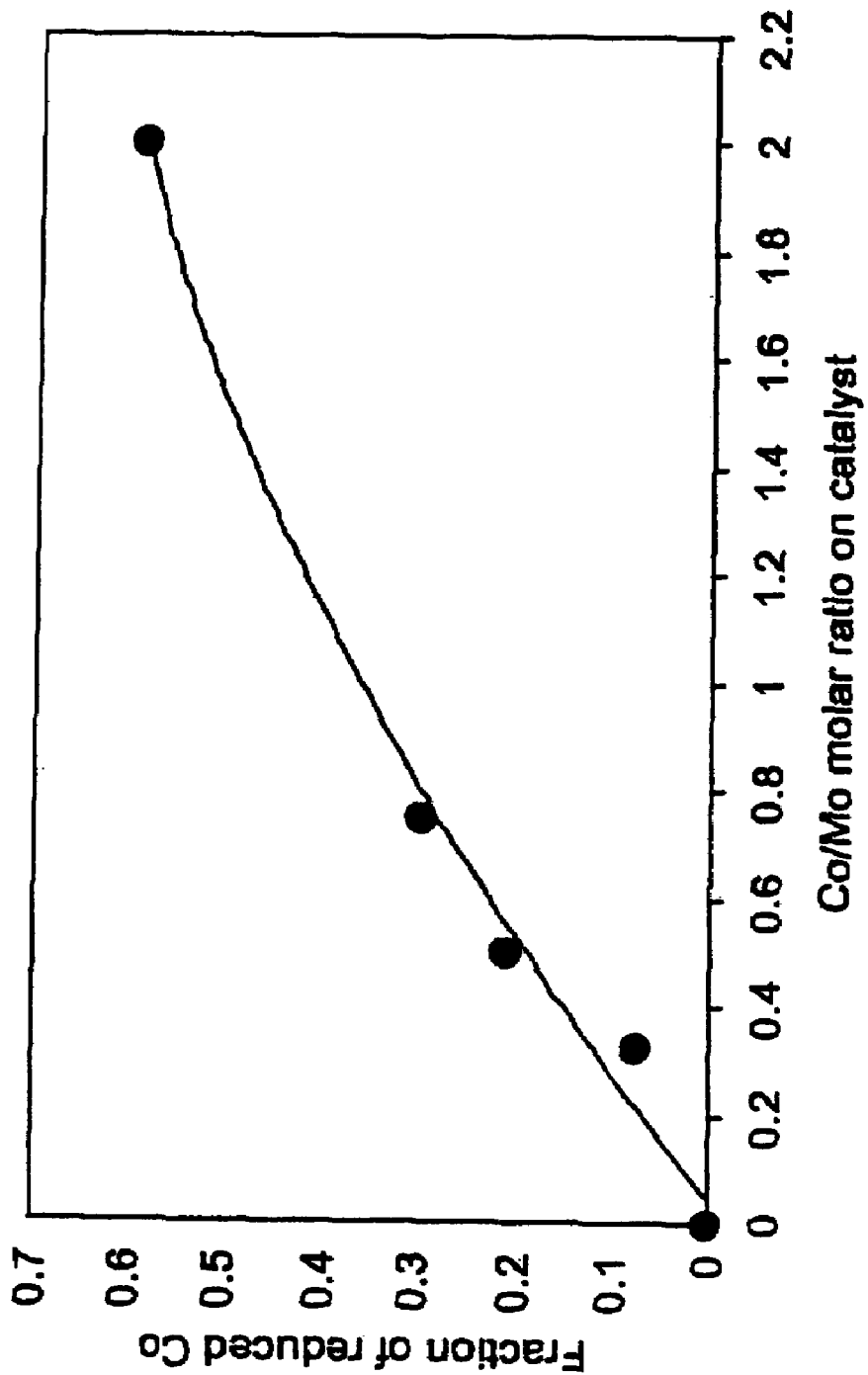
FIG. 12: Fraction of cobalt reduced to the metallic state as a function of Co:Mo nominal ratio, as determined by XPS on samples pretreated under H$_2$ at 500° C. and heated in He at 700° C., without exposure to air.

The respective surface fractions of Co in the two chemical states were obtained by fitting the spectra with asymmetric curves centered at the corresponding binding energies. The fraction of Co in the metallic state after reduction at 500° C., as determined from this analysis, is shown in FIG. 12 as a function of the Co:Mo ratio. At low Co:Mo ratios, when the majority of the Co oxide species are interacting with Mo, most of the Co remains in the oxidic form, but as the Co:Mo ratio increases, a larger fraction of Co gets reduced. In agreement with this trend and with the TPR data shown above, previous reports have indicated that the Co—Mo interacting phase is, in fact, more difficult to reduce than Co oxide alone.

The assignment of the Mo 3d$_{5/2}$ levels to different chemical states of Mo is not as straightforward as that of Co. As shown in Table 1, the spectra of the reduced catalysts can be described in terms of three contributing peaks. The one at the lowest binding energy appears in the same region as that of $Mo^{4+}$ in $MoO_2$. The one at the highest binding energy (233.1 to 233.9 eV) appears at slightly higher energy than that of $Mo^{6+}$ in $MoO_3$. This peak has been previously assigned to $Mo^{6+}$ species in an oxidic environment although some have indicated that these species should have binding energies in the region 232.5-232.7 eV. The remaining peak appearing at around 231 eV can be attributed to Mo in an intermediate state such as $Mo^{+5}$. From the fitting of the spectra of the different catalysts with asymmetric curves centered at the indicated binding energies, the fraction of reduced Mo (i.e., $Mo^{4+}+Mo^{5+}$) have been calculated and plotted in FIG. 13 as a function of the Co:Mo ratio. It is observed that, except for the monometallic catalyst there is a slight decrease on the reducibility of Mo as the Co:Mo ratio increases. That is, the Co—Mo interaction is also evident from the Mo analysis, although the effect is not as pronounced as for Co.

Figure 14:
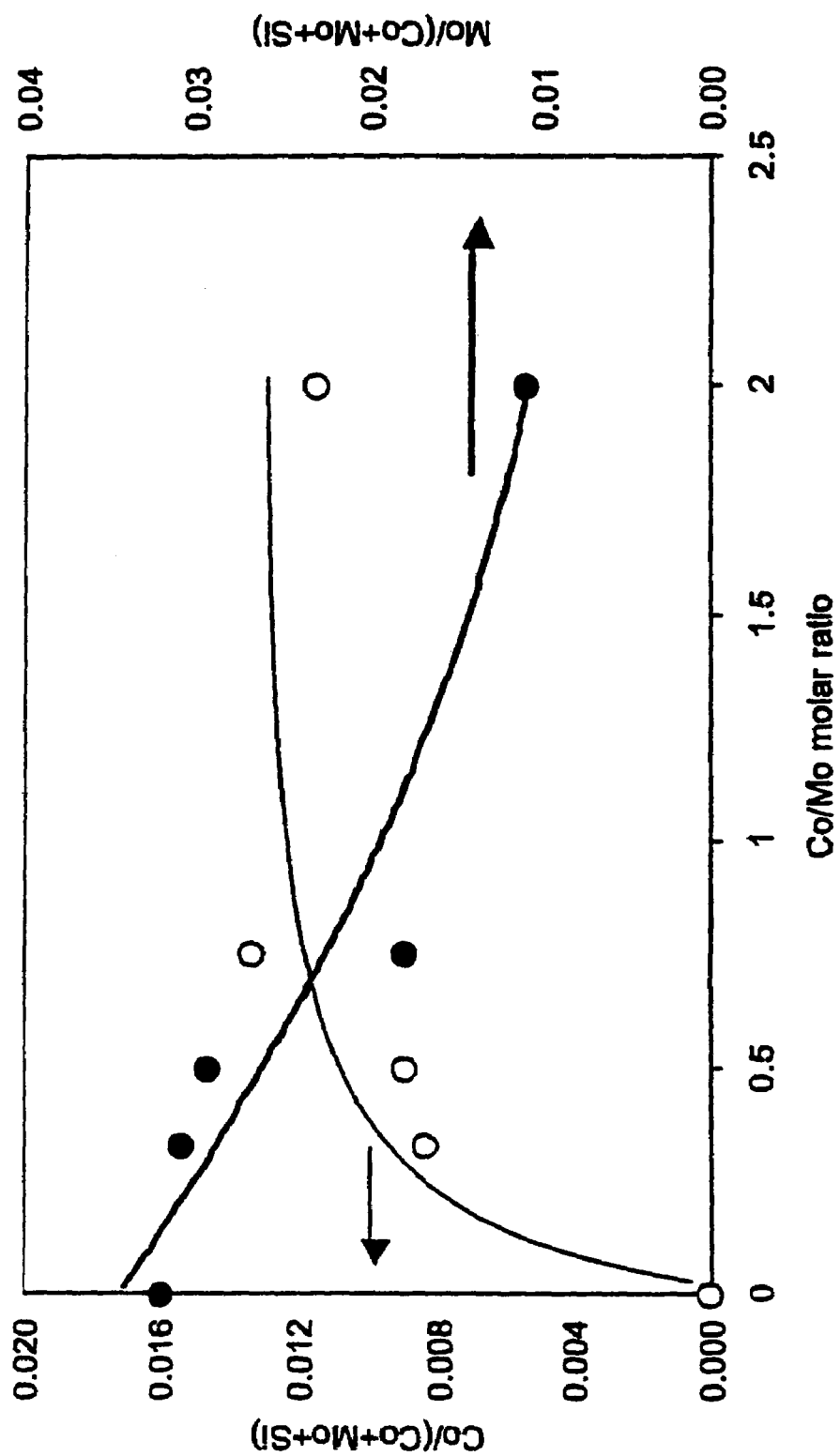
FIG. 14: Surface atomic percentage of molybdenum (filled circles) and cobalt (open circles) as function of the nominal Co:Mo ratio, as determined by XPS on samples pretreated under H$_2$ at 500° C. and heated in He at 700° C., without exposure to air.

Table 2 indicates the surface atomic fractions of Co and Mo on the catalyst after the reduction pretreatment. The intensity of the Si peak remained almost constant for all samples, except for the catalyst with a Co:Mo ratio of 2:1, in which it decreased. FIG. 14 shows the fractions of Co/Si and Mo/Si as a function of bulk Co:Mo ratio. It is seen that, even though the Mo concentration in the catalyst was kept constant, the Mo/Si ratio clearly decreased as the amount of Co increased. In agreement with the DRIFTS data, these results show that the addition of Co results in a gradual coverage of Mo.

TABLE 2

Surface atomic concentrations for reduced catalysts as determined by XPS.

| Reduced Catalysts | Atomic concentration (%) | | |
|---|---|---|---|
| | Mo | Co | Si |
| $Mo/SiO_2$ | 1 | 0 | 30.41 |
| $Co:Mo(1:3)/SiO_2$ | 0.99 | 0.27 | 31.08 |
| $Co:Mo(1:2)/SiO_2$ | 0.94 | 0.29 | 31.04 |
| $Co:Mo(3:4)/SiO_2$ | 0.58 | 0.43 | 31.42 |
| $Co:Mo(2:1)/SiO_2$ | 0.33 | 0.35 | 29.77 |

EXAMPLE 6

X-ray Absorption Spectroscopy (EXAFS)

Figure 15:
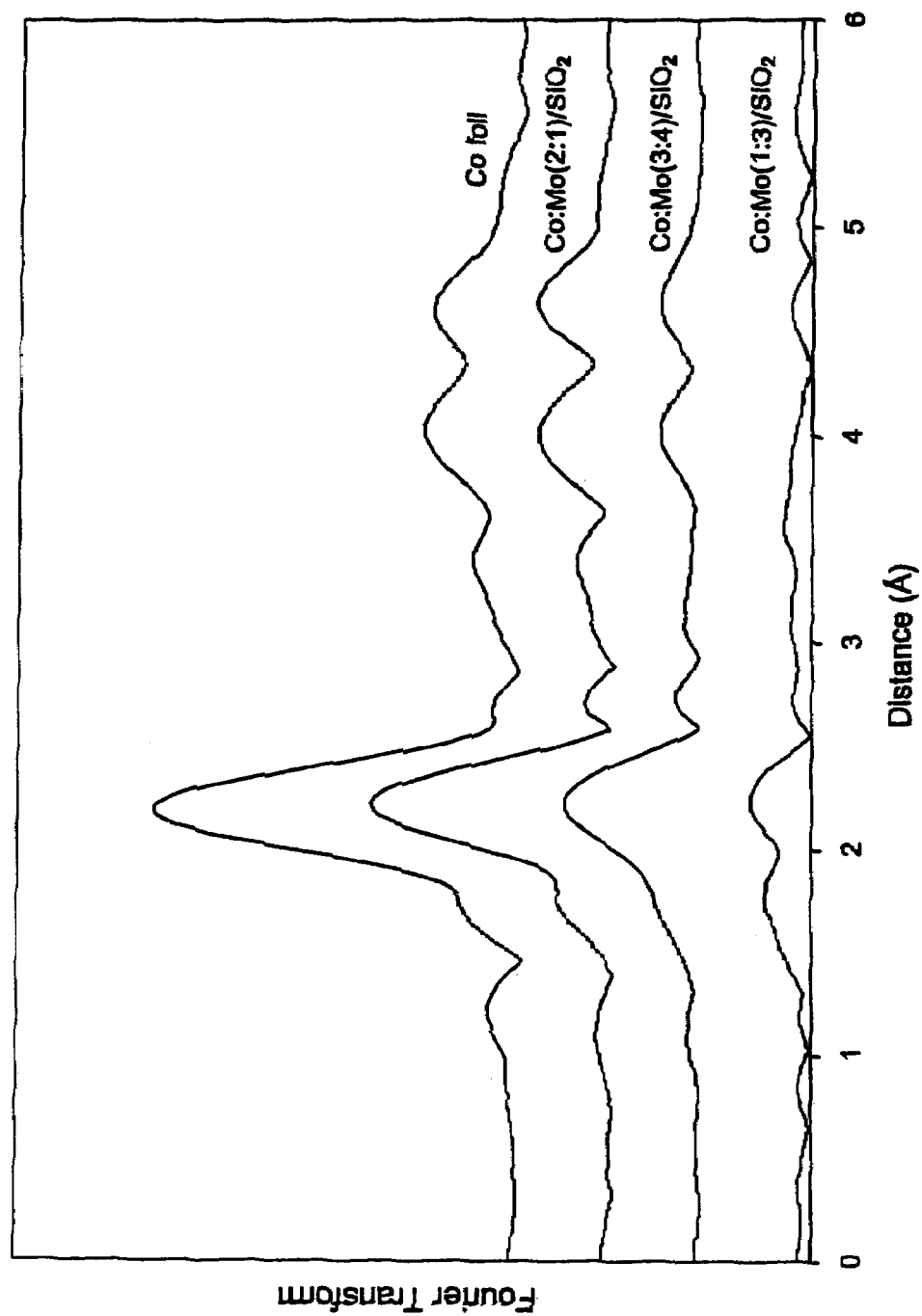
FIG. 15: Fourier transforms of the k$^3$ EXAFS data of the Co K edge obtained for several Co:Mo/SiO$_2$ reduced catalysts with different Co/Mo ratios. The data for a Co foil is included for comparison.
Figure 16:
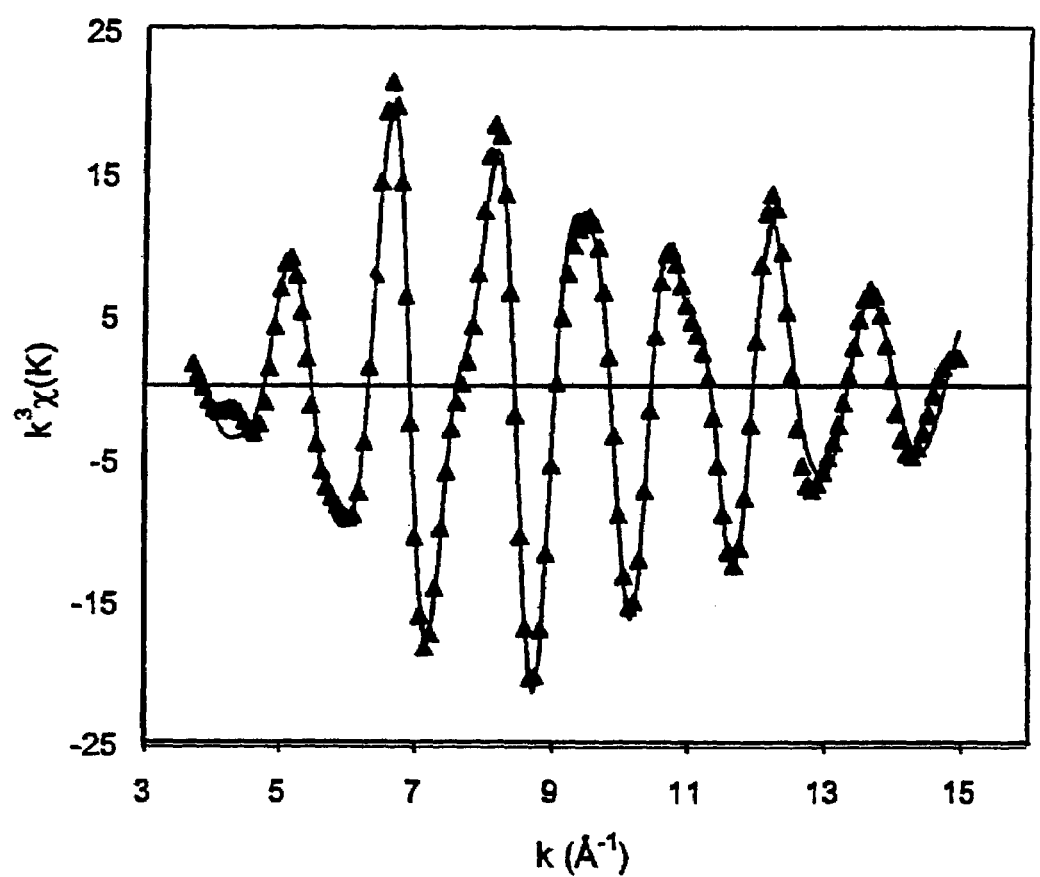
FIG. 16: Fit in k-space for Co:Mo (2:1)/SiO$_2$. Experimental (triangles) and modeled EXAFS contribution around Co (full line).

The EXAFS results for the reduced catalysts, shown in FIG. 15, reveal a definite trend, which corresponds with the XPS data. The data indicate that, keeping the amount of Mo fixed, the fraction of metallic Co increases with the Co:Mo ratio. The appearance of clearly observable peaks in the range corresponding to the 2nd and 3rd coordination spheres (0.25-0.45 nm), indicates that larger Co° clusters are present on the catalyst with the higher Co content. To quantify this trend, the data for the first, second and third coordination shells of Co on the $Co:Mo(2:1)/SiO_2$ were isolated by applying an inverse Fourier transform over a restricted range of r (0.13-0.45 nm). The filtered data were then fitted using FEFFIT program assuming that only Co° was present. As shown in FIG. 16, the quality of this fit was excellent. The structural parameters resulting from the fit are summarized in Table 3. From these results, we can conclude that in reduced $Co:Mo/SiO_2$, with high Co:Mo ratios, a large fraction of Co is present in the form of metallic Co clusters.

TABLE 3

Structural parameters resulting from the fitting of the Co-edge EXAFS data obtained for the $Co:Mo(2:1)/SiO_2$ catalyst. In the table $E_0$ represents the energy shift, sigma the Debye-Waller factor and the r factor is a measurement of the fit quality.

| | | Fitting ($E_0$ = 8.2) | | | |
|---|---|---|---|---|---|
| Reference Phase | Bond | Coordination number | Distances | Sigma | r-factor |
| Co° | Co—Co (1st shell) | 7.8 | 2.492 | 0.0046 | 0.0014 |
| | Co—Co (2nd shell) | 2.4 | 3.523 | 0.0047 | |
| | Co—Co (3rd shell) | 9.6 | 4.327 | 0.0059 | |

Figure 17:
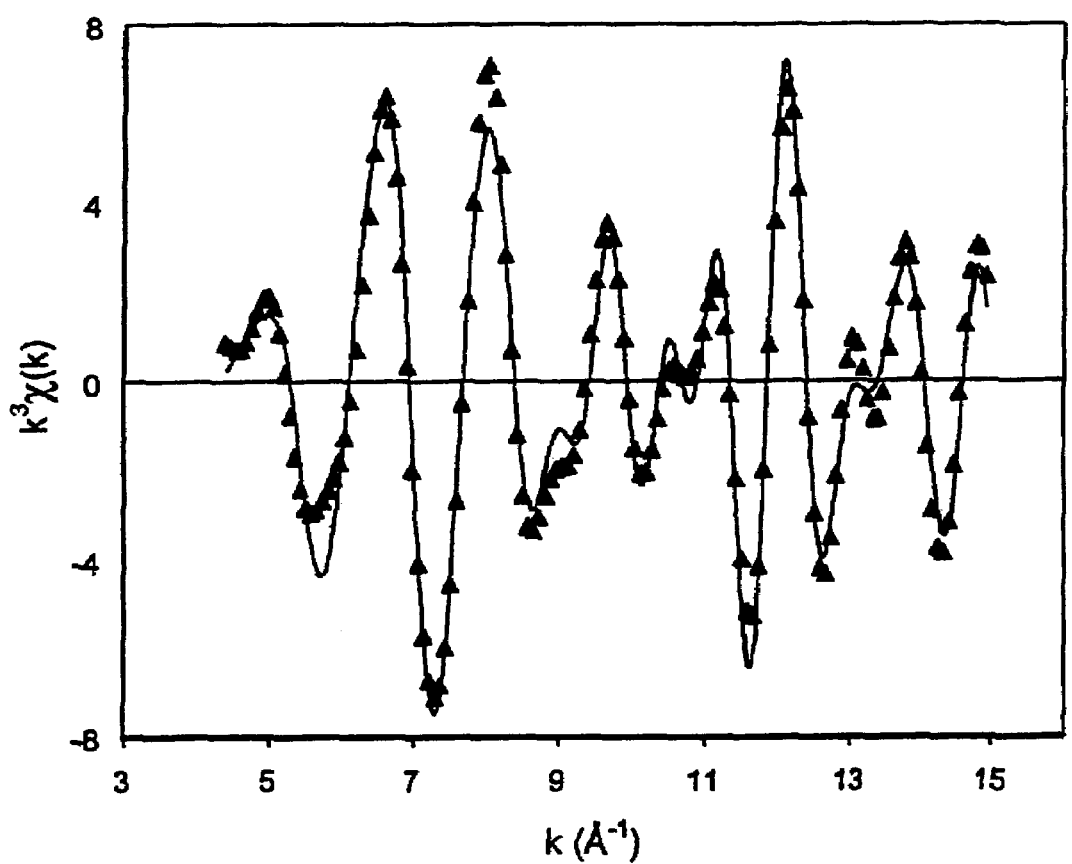
FIG. 17: Fit in k-space for Co:Mo (1:3)/SiO$_2$. Experimental (triangles) and modeled EXAFS contribution around Co (full line).

To compare the structures of the Co phases in the catalysts with low Co:Mo ratios with those of high Co:Mo ratios, filtered EXAFS data were fitted for the Co:Mo (1:3) catalyst, as previously described. In the first attempt, the EXAFS data were fitted using a single phase, which was either metallic or oxidized Co. In both cases, the results were unsatisfactory. A more complex model was needed to obtain a good fit. In the second model used for fitting, the simultaneous presence of metallic Co clusters and oxidized Co species was considered. Satisfactory fits were only obtained with the simultaneous presence of Co metallic clusters and a $CoMoO_4$ phase. FIG. 17 illustrates the quality of the fit, while Table 4 summarizes the structural parameters determined from the analysis. The resulting parameters indicate that in this catalyst, cobalt is mainly forming a $CoMoO_4$-like phase and a small fraction is forming metallic Co.

TABLE 4

Structural parameters resulting from the fitting of the Co-edge EXAFS data obtained for the $Co:Mo(1:3)/SiO_2$ catalyst. Six different scattering paths were used for the Co—O (1st and 2nd shells) and Co—Mo (2nd shell) pairs.

| | | Fitting ($E_0$ = 9.88) | | | |
|---|---|---|---|---|---|
| Phase | Bond | Coordination number | Distances (Å) | Sigma | r-factor |
| a-$CoMoO_4$ | Co—O (1st shell) | 3 | 2.1 ± 0.18 | 0.0029 | 0.0323 |
| | Co—Co (1st shell) & | 1 | 3.03 3.15 | 0.0035 | |
| | Co—Mo (1st shell) | | | | |
| | Co—O (2nd shell) | 3 | 3.7 ± 0.05 | 0.0019 | |
| | Co—Mo (2nd shell) | 3.2 | 3.9 ± 0.13 | 0.0027 | |
| Co° | Co—Co (1st shell) | 1.5 | 2.50 | 0.0035 | |
| | Co—Co (2nd shell) | 2.2 | 3.65 | 0.0023 | |
| | Co—Co (3rd shell) | 1.6 | 4.35 | 0.0033 | |

Production of Carbon Nanotubes by Catalytic Disproportionation of CO

EXAMPLE 7

Influence of Co:Mo Ratio on SWNT Selectivity

Figure 18:
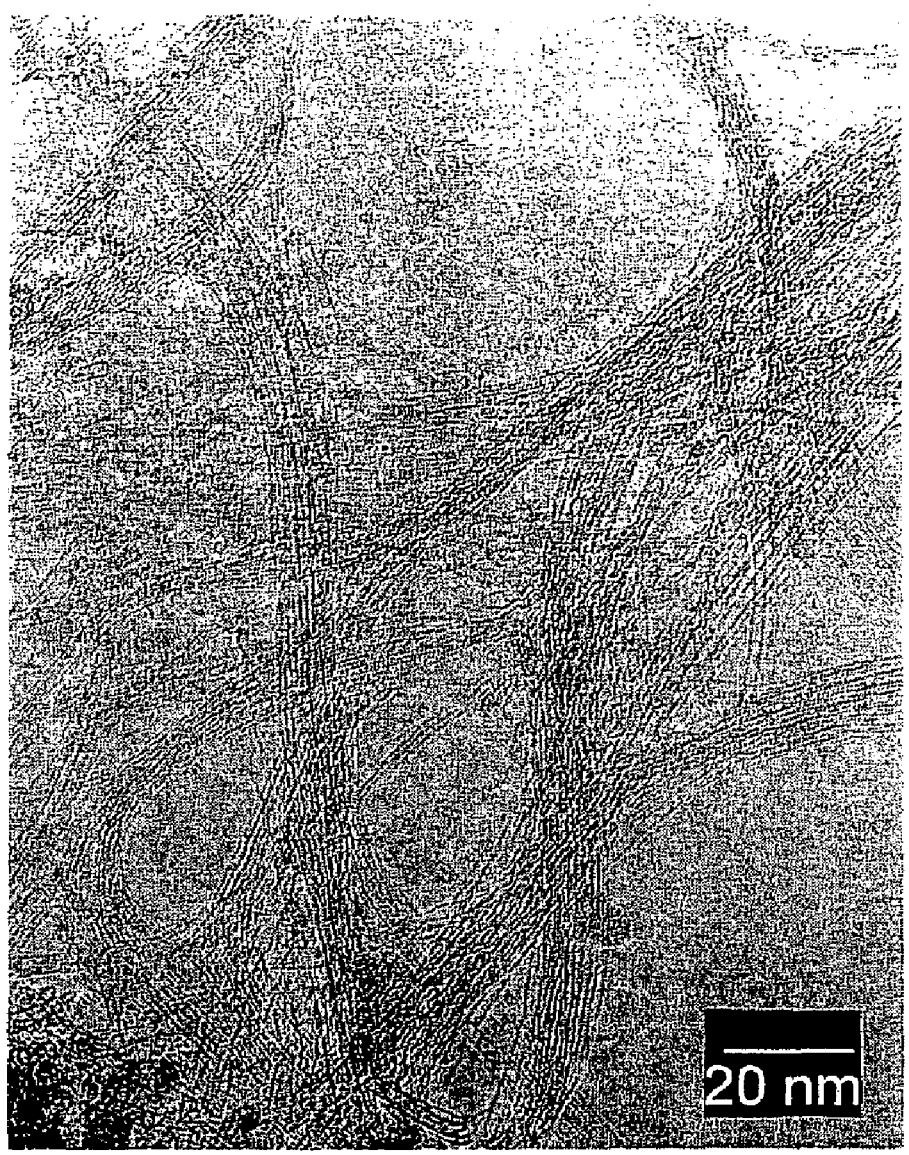
FIG. 18: TEM images showing SWNTs produced by CO disproportionation on a Co:Mo(1:3)/SiO$_2$ catalyst.
Figure 19:
FIG. 19: TEM images showing a mixture of SWNTS, MWNTs and graphite produced by CO disproportionation on a Co:Mo(2:1)/SiO$_2$ catalyst.

The ability of the different catalysts to produce SWNTs by CO disproportionation was tested by passing pure CO over the catalyst at 700° C. Before the reaction, the catalysts were calcined in air at 500° C., then reduced in $H_2$ at 500° C., and then heated in He flow up to the reaction temperature. At the end of a 2-h reaction period, the spent catalyst containing the carbon deposits was cooled down in He flow. The characterization of the carbon deposits was done by using two main techniques that we have previously used and tested. They are temperature programmed oxidation (TPO) and transmission electron microscopy (TEM). We have previously shown that from the TPO results we can obtain a quantitative measure of the carbon yield and selectivity towards SWNTs. These results are summarized in Table 5 and illustrate the strong influence of the Co:Mo ratio on SWNTs selectivity. The TEM observations totally support the TPO results. As shown in FIGS. 18 and 19, a contrasting difference is observed on the carbon structures produced with the two different samples. While the sample with a Co:Mo ratio of 1:3 exhibited a high density of SWNTs, the sample with a Co:Mo ratio of 2:1 mainly produced MWNTs and graphitic carbon deposits. In the first case, one can observe the typical parallel lattice fringes characteristic of SWNTs. In the second case, a spacing of 0.34 nm can be observed between the fringes, which is characteristic of the space between individual walls in multi-walled nanotubes.

TABLE 5

Carbon yield and selectivity for two catalysts with different Co:Mo ratio. The yield is defined as mass of total deposited carbon per mass of catalyst. The selectivity to SWNT is the mass of SWNT per total mass of carbon deposits.

| Catalyst | % Amorphous carbon and graphite | % SWNT | % MWNT | Total carbon yield. |
|---|---|---|---|---|
| Co:Mo(1:3)/SiO$_2$ | 18.7 | 70.7 | 10.6 | 18.25% |
| Co:Mo(2:1)/SiO$_2$ | 14.8 | 15.2 | 70.0 | 16.35% |

It is noteworthy that when the Co:Mo(1:3)/SiO$_2$ catalyst that exhibited a high yield and selectivity towards SWNTs was employed without the reduction step or with an exceedingly high reduction temperature, poor SWNTs yields were attained. It is suggestive that the TPR indicates that the Co reduction in the Co:Mo (1:3) does not start below 500° C. Some degree of reduction is apparently necessary, since a totally oxidized catalyst is not efficient. Alternatively, a high degree of reduction of the catalyst, causing the appearance of metallic Co, is also detrimental for the selectivity towards SWNTs.

Characterization of the Spent (Reacted) Catalysts

EXAMPLE 8

Formation of Metallic Co and Mo Carbide

Figure 20:
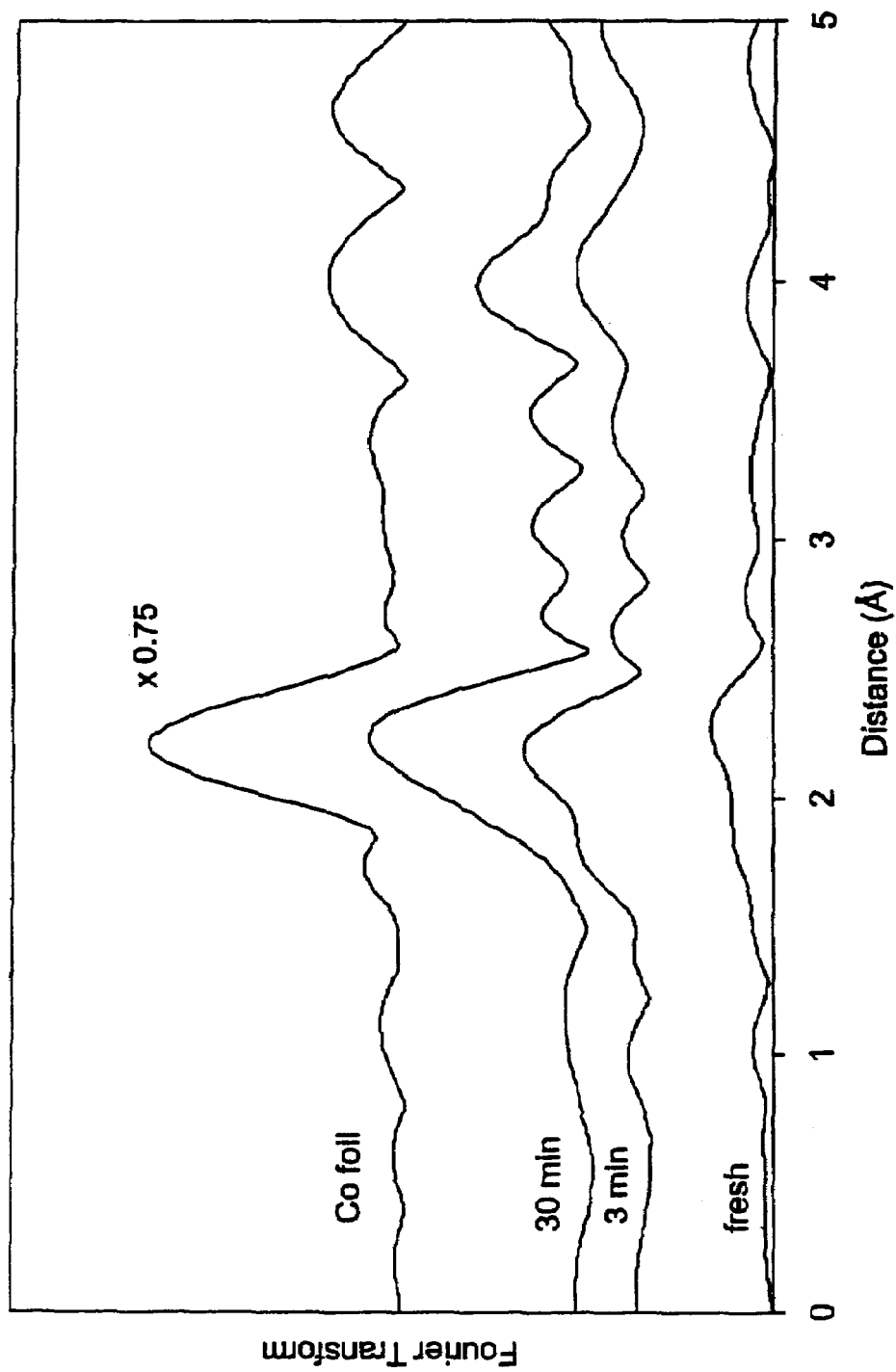
FIG. 20: Fourier Transforms of the k$^3$ EXAFS data obtained for the K edge of Co for a fresh Co:Mo(1:2)/SiO$_2$ catalyst reduced in hydrogen (500° C.), and after the growth of carbon nanotubes for reaction periods of 3 and 30 minutes. The EXAFS data of a Co foil is included for comparison.

The EXAFS results for the spent catalysts are shown in FIG. 20. The Fourier Transform of the EXAFS data for the K edge of Co ($E_0$=7,709 eV) for the Co:Mo (1:2) catalyst show that after the pretreatment and before the reaction with CO, a significant fraction of Co remains oxidized. However, as the reaction proceeds, metallic Co begins to form and after 30 min., the Fourier Transform is indicative of pure Co metal. Undoubtedly during the formation of carbon nanotubes over the selective catalyst, Co is gradually reduced to the metallic state. The detailed structural analysis of the Co EXAFS data indicated that as the reaction proceeds the Co reduction is accompanied by an increase in metal particle size. Evidence for this process is presented in Table 6 where an increase on the Co—Co coordination number as a function of reaction time is observed.

TABLE 6

Structural parameters for the Co:Mo(1:2)/SiO$_2$ catalyst after different reaction periods, as obtained from the EXAFS data analysis. $N_{M—M}$, $N_{M—C}$ and $N_{M—O}$ represent the coordination number between the metals (Mo or Co) with another metal atom, a C atom and an O atom respectively.

| Sample | Sample Treatment | Edge (M) | $E_0$ | Sigma | $N_{M—M}$ | $N_{M—O}$ | $N_{M—C}$ | Distances (Å) | r-factor |
|---|---|---|---|---|---|---|---|---|---|
| CoMo(1:2)/SiO$_2$ | Spent 3 min | Co | 4.2 | 0.0068 | 5.8 | — | — | 2.47 | 0.043 |
| | | | | 0.0025 | — | 2.2 | — | 2.05 | |
| CoMo(1:2)/SiO$_2$ | Spent 30 min | Co | 9.4 | 0.0065 | 9.2 | — | — | 2.50 | 0.020 |
| | | | | 0.0003 | — | 1.1 | — | 2.07 | |
| Mo$_2$C | Reference | Mo | 6.6 | 0.0063 | 11.6 | — | — | 2.97 | 0.022 |
| | | | | 0.0106 | — | — | 5.8 | 2.08 | |
| CoMo(1:2)/SiO$_2$ | Spent 30 min | Mo | 7.1 | 0.0075 | 6.7 | — | — | 2.98 | 0.038 |
| | | | | 0.0075 | — | 3.3 | — | 2.09 | |
| | | | | 0.0039 | — | — | 0.9 | 1.68 | |

Figure 21:
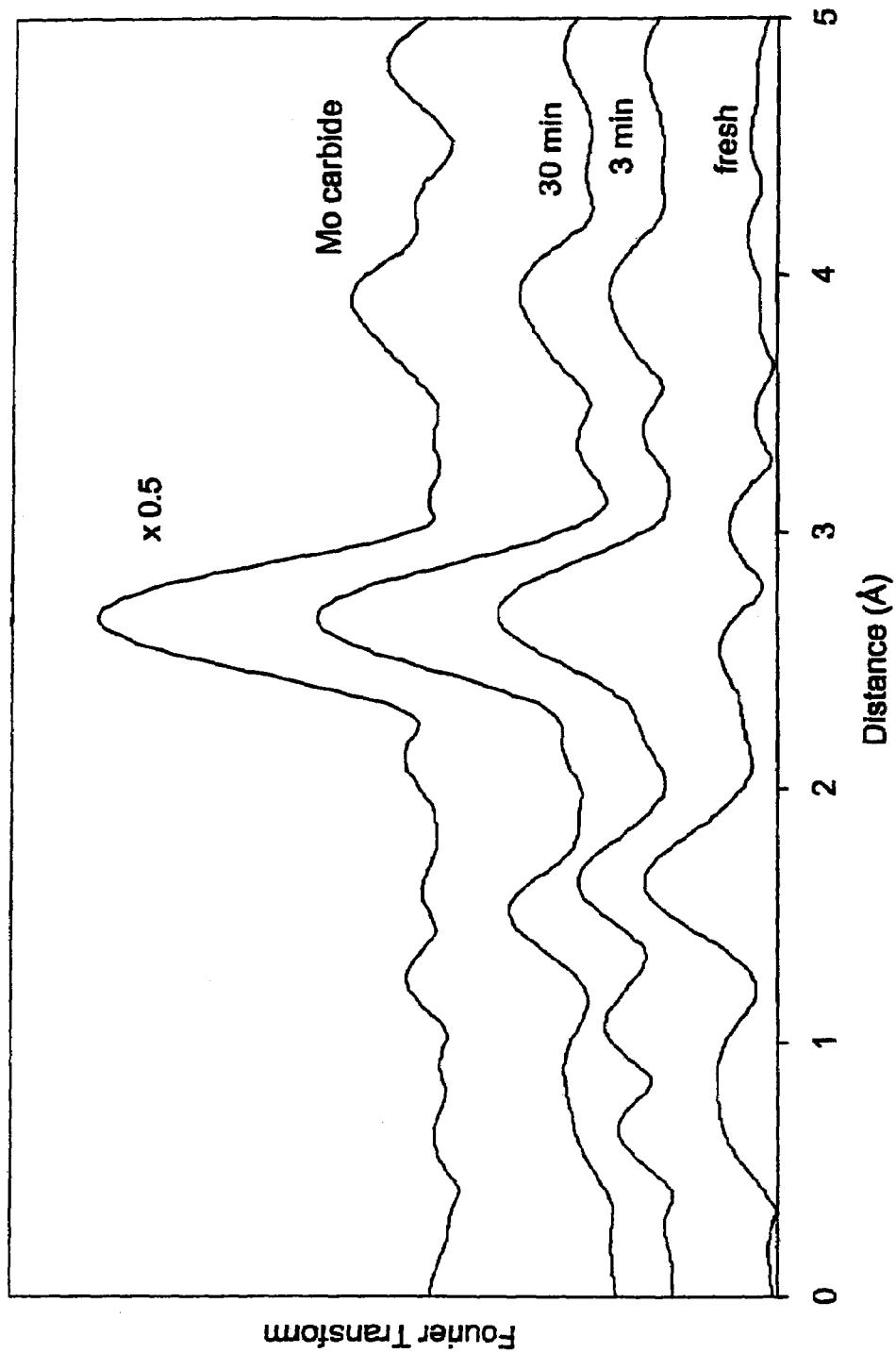
FIG. 21: Fourier Transforms of the $k^3$ EXAFS data obtained for the K edge of Mo for a fresh Co:Mo(1:2)/SiO$_2$ catalyst reduced in hydrogen (500° C.), and after the growth of carbon nanotubes for reaction periods of 3 and 30 minutes. The EXAFS data of Mo$_2$C is included for comparison.

In the same way, as illustrated in FIG. 21, after a 30-min reaction period, the Fourier Transforms of the EXAFS data of Mo ($E_0$=20,000 eV) reveal a drastic change, developing peaks that correspond exactly to those of the Mo$_2$C reference. The transformation of oxidized Mo species into Mo carbide during the reaction is indeed very clear, with a small fraction of unconverted Mo oxide remaining in the catalyst. This conversion can be clearly seen from the EXAFS analysis data of the spent catalyst summarized in Table 6. The best fit of the experimental data was obtained when the coordination sphere of the Mo was described as composed as Mo—C, Mo—Mo, and Mo—O. This indicates that the conversion to Mo carbide is not complete and a fraction of Mo remains in the spent catalyst as an oxidized species.

Characteristics of Oxidic Catalysts

The UV-Vis and the X-ray absorption data indicate that, in all the calcined samples, Mo is in an octahedral environment in the 6+ oxidation state. Furthermore, from the values of the adsorption edge energy it can be concluded that the molybdenum oxide species are dispersed as small clusters with average domain size somewhat larger than that of the heptamolybdate ion, but not large enough to form bulk MoO$_3$. Regardless of the Co:Mo ratio in the catalysts, the majority of Mo occurs as these oxidic clusters. It is apparent that the degree of dispersion of Mo is more a result of the loading and degree of interaction with the support, rather than a consequence of the extent of interaction with Co. A contrasting picture is obtained from the characterization of Co, particularly in the catalysts with low Co:Mo ratio. In this case, both, the UV-Vis DRS and the XANES data obtained on the catalyst with a Co:Mo ratio of 1:3 demonstrated that most of the Co is in an environment similar to that in α-CoMoO$_4$ i.e., closely interacting with Mo. However, the slight but clear differences between the spectra of the catalyst and the α-CoMoO$_4$ reference suggest that the similarity is limited to the local environment and nature of ligands. In fact, the EXAFS data demonstrate that bulk α-CoMoO$_4$ is not present in the bimetallic catalysts. Bulk α-CoMoO$_4$ has only been observed by XRD in silica-supported catalysts at high metal contents.

All these results form the basis of a model of the calcined (oxidic) catalysts with low Co:Mo ratios (e.g., preferably less than 3:4) wherein Co is in the form of a CoMoO$_4$-like layer on top of dispersed Mo oxide clusters. Therefore, most of the Co is in an interacting phase, while only a fraction of Mo is in such a phase. Therefore, the characterization of Mo does not reflect a strong interaction with Co, while the characterization of Co shows in fact a high degree of interaction with Mo.

In contrast, when the Co is in excess, more than one type of Co species is present in the catalyst. The UV-Vis-DRS data show that in addition to the interacting phase of Co, which dominates at low Co:Mo ratios, a non-interacting phase begins to form as the Co content increases. The X-ray absorption data (FIG. 7) indicate that this non-interacting species is CO$_3$O$_4$, which has been previously detected by Raman spectroscopy and X-ray diffraction in Co:Mo/SiO$_2$ catalysts.

Characteristics of Reduced Catalysts

The DRIFTS data of adsorbed NO give further evidence of the interaction between Co and Mo in the reduced catalysts with low Co:Mo ratios. When the position of the symmetric-stretching band of dinitrosyl adsorbed on Co is compared for the monometallic Co and bimetallic Co—Mo catalysts, a shift of about 8 cm$^{-1}$ to higher wavenumbers is observed on the bimetallic catalyst (FIG. 10). Furthermore, the binding energy obtained by XPS for the fraction of Co that remains unreduced after the reduction treatment in the bimetallic catalyst (around 781.4 eV) corresponds to that of Co interacting with Mo oxide, rather than of a non-interacting Co oxide species (780.1-780.5 eV).

However, as the amount of Co in the reduced catalyst increases, the shift in the IR main band to higher wavenumbers becomes gradually smaller, until the position of the band coincides with that of the monometallic Co/SiO$_2$ catalyst, i.e. 1803 cm$^{-1}$. At the same time, the intensity of the band ascribed to the Mo sites gradually decreases until it practically disappears for the catalyst with a Co:Mo ratio of 2:1. This trend is consistent with the XPS data, which indicate that the Mo sites are progressively covered by Co as the Co:Mo ratio increases. It has been proposed that cobalt molybdate is present in the silica-supported catalyst, and that the non-interacting Co or Mo species (depending on which metal is in excess) agglomerate over CoMoO$_4$ forming a geode-like structure. The results provided herein clearly show that when Mo is in excess, this is not the case. The DRIFTS data show that the Co sites are strongly influenced by the presence of Mo but they are not covered by it. On the other hand, a geode-like structure could be postulated for the catalysts when Co is in excess. That is, Co oxide could partially cover the Co molybdate species.

Figure 13:
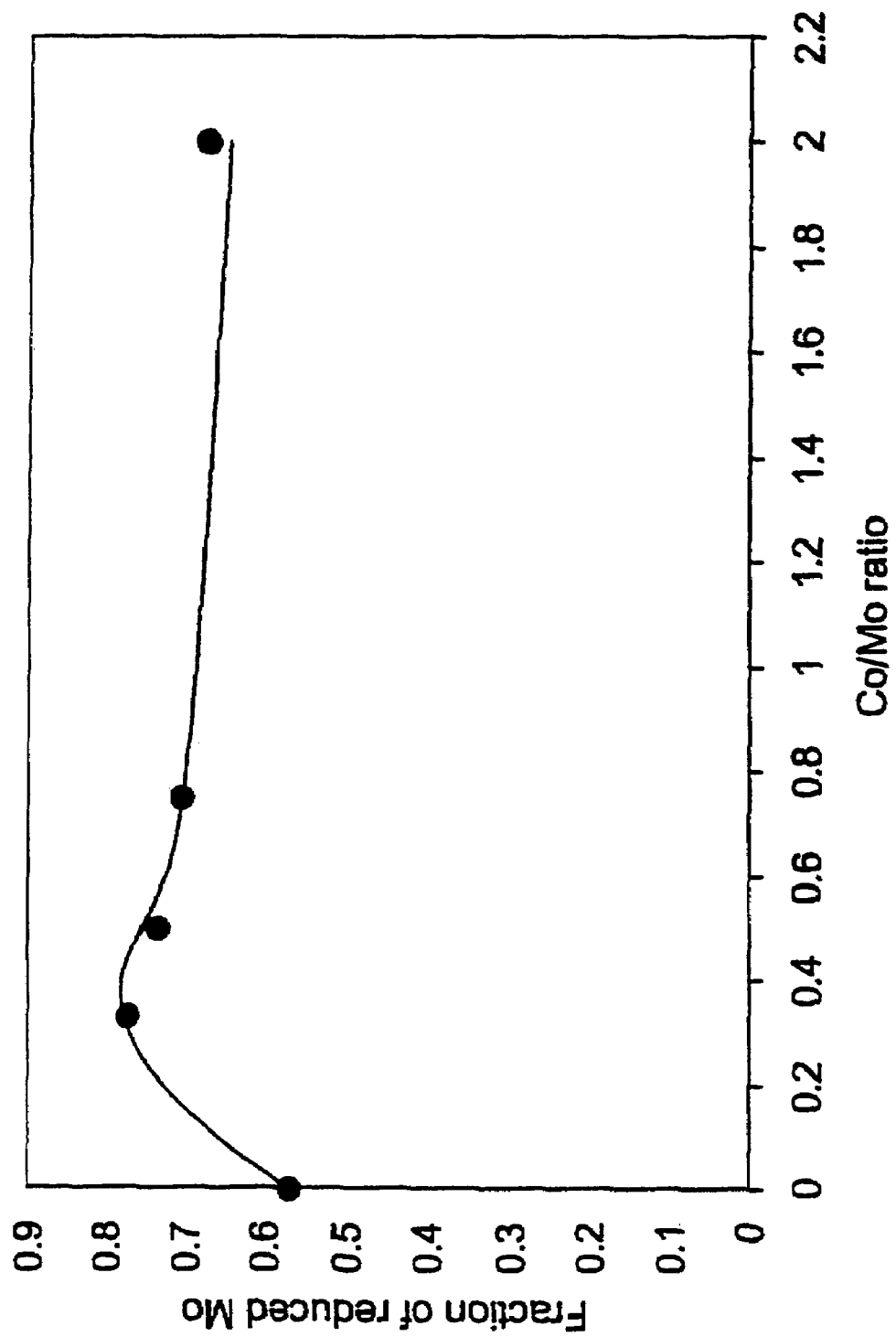
FIG. 13: Fraction of molybdenum reduced to Mo(IV) and Mo(V) as a function of Co:Mo nominal ratio, as determined by XPS on samples pretreated under H$_2$ at 500° C. and heated in He at 700° C., without exposure to air.

From the combined analysis of the XPS, TPR, and EXAFS data, one can infer that the reducibility of the Co species is strongly influenced by the presence of Mo in the catalyst. The amount of reducible Co clearly increases with the Co:Mo ratio. This trend can be explained in terms of the formation of an interacting Co molybdate-like species in the oxidized catalyst, which should be more difficult to reduce than non-interacting Co oxide. At the same time, as shown in FIG. 13, the reducibility of the Mo species is also affected by the presence of Co, indicating that although the techniques that probe bulk Mo do not show an interaction with Co (XANES, UV/V DRS), an interaction indeed exists at the catalyst surface and it is more pronounced at low Co:Mo ratios.

Figure 22:
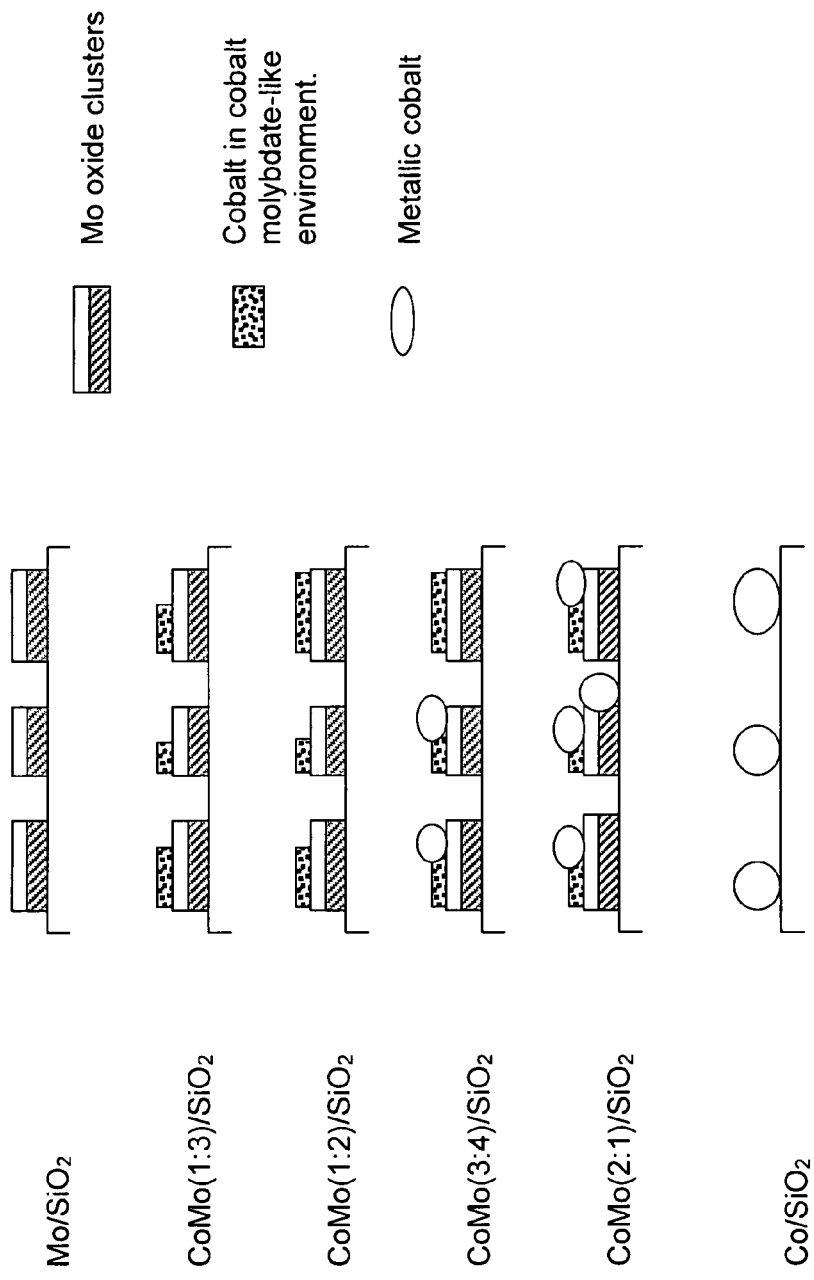
FIG. 22: Schematic description of the structure of the reduced catalysts as derived from the characterization methods.

Combining all the information obtained from FTIR, XPS, UV/V DRS, H$_2$-TPR and XAS, a coherent representation of the catalyst structure, as it stands right before the beginning of the SWNTs reaction, can be envisioned and is schematically represented in FIG. 22. Three main phases have been identified in the reduced catalyst just before reaction: dispersed molybdenum oxide clusters, cobalt interacting with molybdenum oxide in a cobalt molybdate-like structure, partially covering the Mo oxide clusters, and segregated metallic cobalt particles. The fraction of each of these species depends on the Co:Mo ratio.

The CoMo (1:3) and CoMo (1:2) species of FIG. 22 represent preferred embodiments of the invention wherein Co and Mo are disposed upon a support material wherein the majority of the Mo occurs as dispersed Mo oxide clusters and the majority of the Co occurs in a CoMoO$_4$-like phase with the Co therein primarily in an octahedral configuration, and wherein the CoMoO$_4$-like phase occurs substantially (i.e. preferably at least 50%) disposed upon the dispersed Mo oxide clusters.

Relationship Between Catalyst Morphology and Selectivity Towards SWNTs

When Co and Mo co-exist in the catalysts, especially when Mo is in excess, SWNTs are formed with high selectivity. The results obtained by EXAFS on the spent Co:Mo(1:2)/SiO$_2$ catalyst, clearly show that Co suffers a severe transformation under reaction conditions. Before reaction, but after pretreatment in H$_2$ at 500° C. and then in He at 700° C., a considerable fraction of Co is still in the oxide state closely interacting with Mo on the surface, as shown by FTIR, XPS and XAS. After 3 min under reaction conditions, a significant growth in metallic Co was observed, although some oxidized Co was still present. After 30 min, the particles were even larger and essentially all the Co became metallic. Simultaneously Mo that was initially in the oxidized state is converted to the carbidic form, as clearly demonstrated by EXAFS.

The role of Co in the Co:Mo catalyst is the activation of CO gas. However, when Co is in the form of large metal aggregates, it has the tendency to generate mostly multi-walled carbon nanotubes (MWNTs), carbon filaments and graphite. When Mo is present in the catalyst but Co is not in excess, a well-dispersed Co$^{+2}$ species in the form of a Co molybdate-like phase is stabilized. The formation of this interacting Co molybdate-like species plays a determining role in the catalyst selectivity towards the formation of SWNTs.

The effect of having Co stabilized on this cobalt-molybdate like environment results in minimized reduction and formation of large metallic aggregates. The importance of preventing the reduction of Co is evident when the selective catalyst is compared with a non-selective one (e.g., wherein the Co:Mo ratio is 2:1). In the non-selective catalyst, most of the Co in the oxidic state after calcination is in the form of CO$_3$O$_4$ and, as in the monometallic Co/SiO$_2$ catalyst, this oxide is converted into large metallic Co clusters upon reduction. By contrast, on the SWNT-selective catalyst (lower Co:Mo ratios), a concerted mechanism should take place during the reaction. As the CO disproportionation starts during catalysis, Mo oxide is converted into Mo carbide. This transformation breaks up the Co molybdate-like structure, allowing for the reduction of Co by CO. However, in the selective catalyst, the Co ions are now highly dispersed and in the presence of high concentration of CO in the gas phase. This environment is favorable for the production of SWNTs instead of the sintering that would normally occur during a high temperature reduction process. Extremely small metal Co clusters are released into the gaseous Co environment and catalyze the formation of SWNTs.

On the very small Co clusters, substantial production of MWNTs, carbon filaments, and graphite does not occur. Such production of MWNTs, carbon filaments, or graphite normally occurs on larger metallic Co clusters, following the well-known mechanism for carbon filament growth. That is, the metal clusters begin to decompose CO therein producing Co carbide particles, which then tend to precipitate graphite at their ends in the form of cylindrical filaments.

Relationship between Reaction Temperature and SWNTs Diameters

It is a novel feature of the present invention that the average diameters of SWNTs formed using the catalyst described herein can be controlled selectively by selection of a particular reaction temperature, and by controlling the level of exposure of the catalyst to $CO_2$ during the reaction. As noted previously, the level of $CO_2$ in the reaction vessel used to conduct SWNTs formation should be held below a maximum threshold, i.e., preferably less than a threshold of 1% $CO_2$ in the reaction vessel.

Figure 23:
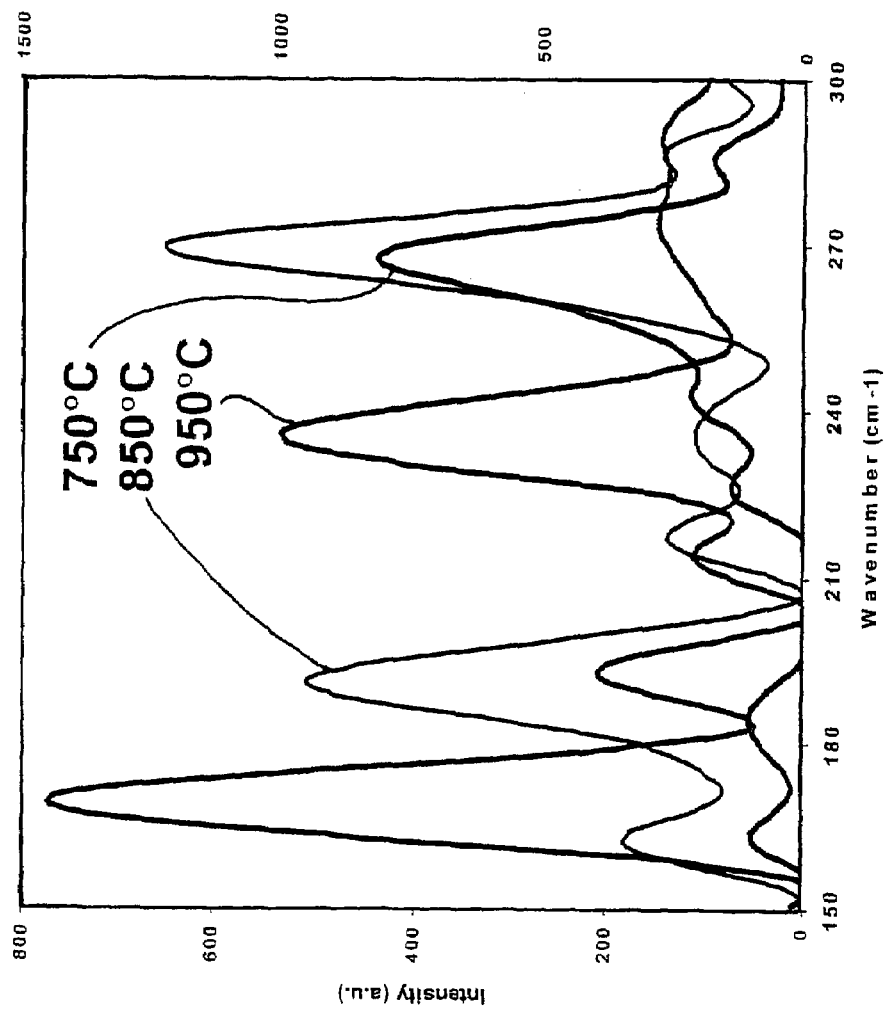
FIG. 23: Raman spectrum of diameters of SWNTs produced by catalytic disproportionation of CO on Co:Mo/SiO$_2$ at 750° C., 850° C. and 950° C.
Figure 24:
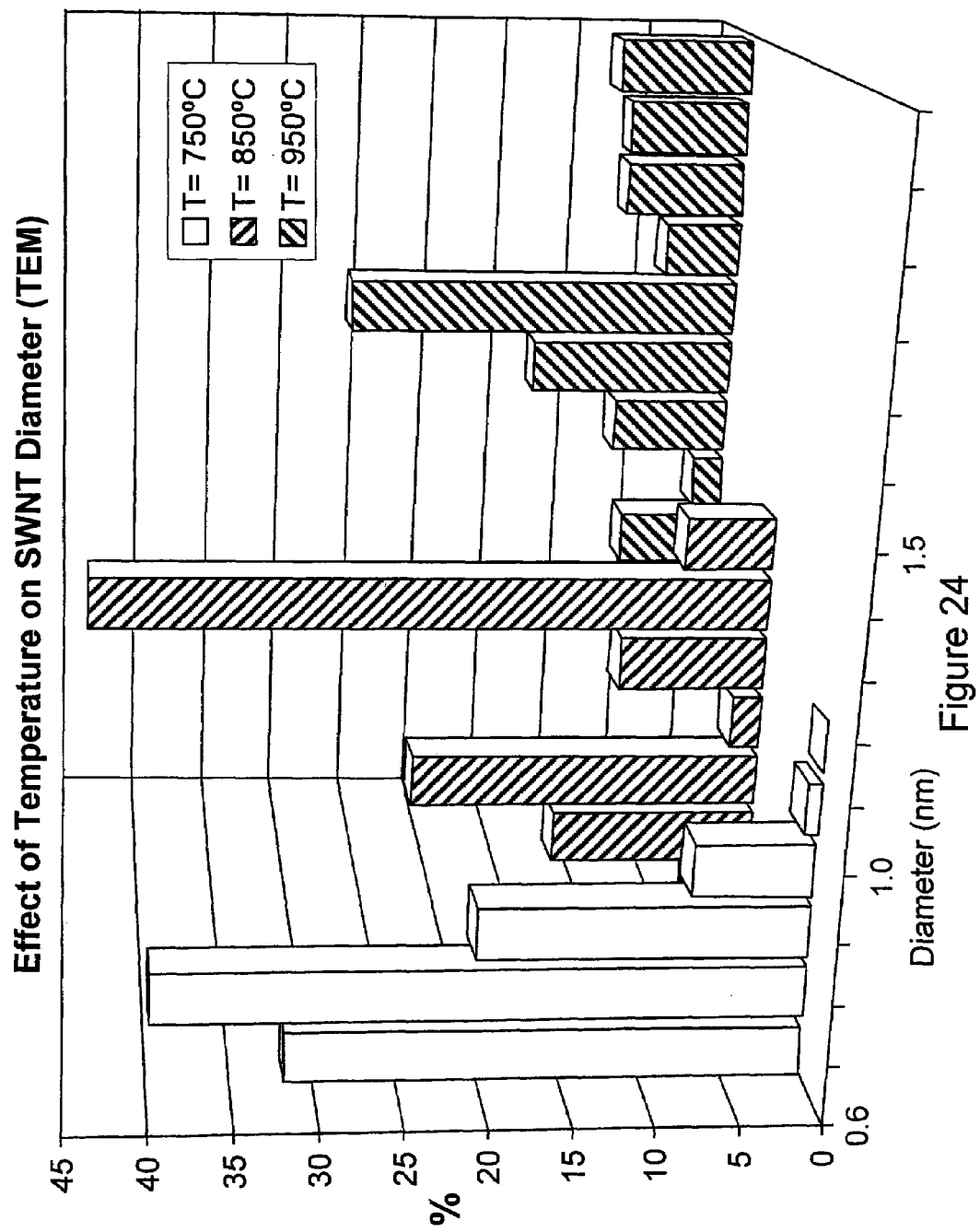
FIG. 24: Graphical description of the distribution of diameters of SWNTs formed under conditions of 750° C., 850° C. and 950° C.

When the reaction temperature is between about 700° C. and about 800° C. (and preferably between 725° C. and 775° C.), the majority of the SWNTs have diameters between about 0.7 nm (±0.1 nm) and about 0.9 nm (±0.1 nm). When the reaction temperature is between about 800° C. and 900° C. (and preferably between 825° C. and 875° C.), the majority of the SWNTs have diameters between about 0.9 nm (±0.1 nm) and about 1.2 nm (±0.1 nm). When the reaction temperature is between about 900° C. and 1000° C. (and preferably between 925° C. and 975° C.), the majority of the SWNTs have diameters between about 1.3 nm (±0.1 nm) and about 1.7 nm (±0.1 nm). FIGS. 23 and 24 show the ranges of diameters of SWNTs formed at 750° C., 850° C., and 950° C.

Changes may be made in the composition and the operation of the various catalysts described herein or in the methods described herein without departing from the spirit and scope of the invention as defined in the following claims.

What is claim is:

1. A method of preferentially forming single walled carbon nanotubes having a particular diameter, comprising:
   providing a catalyst comprising:
      Co and Mo disposed on a support material wherein the majority of the Mo occurs as dispersed Mo oxide clusters and the majority of the Co occurs as $CoMoO_4$ with the Co therein primarily in an octahedral configuration, and wherein the $CoMoO_4$ occurs substantially disposed upon the dispersed Mo oxide clusters; and
   exposing the catalyst in a reactor to a carbon-containing gas at a temperature between about 700° C. and about 800° C. and maintaining a $CO_2$ concentration in the reactor below a threshold $CO_2$ concentration above which the conversion of ionic Co to metallic Co is inhibited, wherein the majority of the single walled carbon nanotubes thus formed have a diameter between about 0.7 nm to about 0.9 nm.

2. The method of claim 1 wherein in the step of providing a catalyst, the support material is silica.

3. The method of claim 1 wherein in the step of exposing the catalyst to a carbon-containing gas, the reactor has a pressure therein between about 1 atm and 7 atm.

4. The method of claim 1 wherein in the step of exposing the catalyst to a carbon-containing gas, the threshold $CO_2$ concentration in the reactor is 1%.

5. The method of claim 1 wherein in the step of exposing the catalyst to a carbon-containing gas, the carbon-containing gas is CO.

6. The method of claim 1 comprising the additional step of reducing the catalyst by exposing the catalyst to a heated hydrogen gas.

7. The method of claim 1 wherein in the step of providing the catalyst, the Mo oxide clusters comprise Mo oxide clusters having a domain size between that of $MoO_3$ and heptamolybdate.

8. The method of claim 1 wherein in the step of providing the catalyst, the catalyst has a molar ratio of Co:Mo of less than 3:4.

9. A method of preferentially forming single walled carbon nanotubes having a particular diameter, comprising:
   providing a catalyst comprising:
      Co and Mo disposed on a support material wherein the majority of the Mo occurs as dispersed Mo oxide clusters and the majority of the Co occurs as $CoMoO_4$ with the Co therein primarily in an octahedral configuration, and wherein the $CoMoO_4$ occurs substantially disposed upon the dispersed Mo oxide clusters; and
   exposing the catalyst in a reactor to a carbon-containing gas at a temperature between about 800° C. and about 900° C. and maintaining a $CO_2$ concentration in the reactor below a threshold $CO_2$ concentration above which the conversion of ionic Co to metallic Co is inhibited, wherein the majority of the single walled carbon nanotubes thus formed have a diameter between about 0.9 nm to about 1.2 nm.

10. The method of claim 9 wherein in the step of providing a catalyst, the support material is silica.

11. The method of claim 9 wherein in the step of exposing the catalyst to a carbon-containing gas, the reactor has a pressure therein between about 1 atm and 7 atm.

12. The method of claim 9 wherein in the step of exposing the catalyst to a carbon-containing gas, the threshold $CO_2$ concentration in the reactor is 1%.

13. The method of claim 9 wherein in the step of exposing the catalyst to a carbon-containing gas, the carbon containing gas is CO.

14. The method of claim 9 comprising the additional step of reducing the catalyst by exposing the catalyst to a heated hydrogen gas.

15. The method of claim 9 wherein in the step of providing the catalyst, the Mo oxide clusters comprise Mo oxide clusters having a domain size between that of $MoO_3$ and heptamolybdate.

16. The method of claim 9 wherein in the step of providing the catalyst, the catalyst has a molar ratio of Co:Mo of less than 3:4.

17. A method of preferentially forming single walled carbon nanotubes having a particular diameter, comprising:
   providing a catalyst comprising:
      Co and Mo disposed on a support material wherein the majority of the Mo occurs as dispersed Mo oxide clusters and the majority of the Co occurs as $CoMoO_4$ with the Co therein primarily in an octahedral configuration, and wherein the $CoMoO_4$ occurs substantially disposed upon the dispersed Mo oxide clusters; and exposing the catalyst in a reactor to a carbon-containing gas at a temperature between about 900° C. and about 1,000° C. and maintaining a $CO_2$ concentration in the reactor below a threshold $CO_2$ concentration above which the conversion of ionic Co to metallic Co is inhibited, wherein the majority of the single walled carbon nanotubes thus formed have a diameter between about 1.3 nm to about 1.7 nm.

18. The method of claim 17 wherein in the step of providing a catalyst, the support material is silica.

19. The method of claim 17 wherein in the step of exposing the catalyst to a carbon-containing gas, the reactor has a pressure therein between about 1 atm and 7 atm.

20. The method of claim 17 wherein in the step of exposing the catalyst to a carbon-containing gas, the threshold $CO_2$ concentration in the reactor is 1%.

21. The method of claim 17 wherein in the step of exposing the catalyst to a carbon-containing gas, the carbon-containing gas is Co.

22. The method of claim 17 comprising the additional step of reducing the catalyst by exposing the catalyst to a heated hydrogen gas.

23. The method of claim 17 wherein in the step of providing the catalyst, the Mo oxide clusters comprise Mo oxide clusters having a domain size between that of $MoO_3$ and heptamolybdate.

24. The method of claim 17 wherein in the step of providing the catalyst, the catalyst has a molar ratio of Co:Mo of less than 3:4.

* * * * *

UNITED STATES PATENT AND TRADEMARK OFFICE
CERTIFICATE OF CORRECTION

PATENT NO. : 7,357,907 B2
APPLICATION NO. : 10/689258
DATED : April 15, 2008
INVENTOR(S) : Daniel E. Resasco et al.

Page 1 of 1

It is certified that error appears in the above-identified patent and that said Letters Patent is hereby corrected as shown below:

In the Specification:
Column 2, line 62: Delete "SWNTS" and replace with -- SWNTs --.

In the Claims:
Column 20, line 6: Delete "Co" and replace with -- CO --.

Signed and Sealed this

First Day of July, 2008

JON W. DUDAS
*Director of the United States Patent and Trademark Office*